United States Patent
Sugimoto

[19]

[11] Patent Number: 6,155,383

[45] Date of Patent: Dec. 5, 2000

[54] BICYCLE BRAKE DEVICE

[75] Inventor: Masanori Sugimoto, Osakasayama, Japan

[73] Assignee: Shimano, Inc., Osaka, Japan

[21] Appl. No.: 09/103,661

[22] Filed: Jun. 22, 1998

Related U.S. Application Data

[63] Continuation-in-part of application No. 08/857,091, May 15, 1997, abandoned.

[30] Foreign Application Priority Data

Jun. 11, 1996 [JP] Japan ................................ 8-149361

[51] Int. Cl.⁷ ...................................................... B62L 1/06
[52] U.S. Cl. ................................. 188/24.12; 188/24.12; 188/24.15
[58] Field of Search ............................... 188/24.11–24.22

[56] References Cited

U.S. PATENT DOCUMENTS

| | | | |
|---|---|---|---|
| 4,351,418 | 9/1982 | Woodring et al. | 188/24.22 |
| 4,823,915 | 4/1989 | Nagano | 188/2 D |
| 5,299,664 | 4/1994 | Peters | 188/24.15 |
| 5,636,716 | 6/1997 | Sugimoto et al. | 188/24.19 |
| 5,649,609 | 7/1997 | Li et al. | 188/24.19 |
| 5,788,019 | 8/1998 | Lee et al. | 188/24.11 |
| 5,894,913 | 4/1999 | Sugimoto | 188/24.21 |
| 5,924,525 | 7/1999 | Sugimoto | 188/24.21 |

FOREIGN PATENT DOCUMENTS

| | | | |
|---|---|---|---|
| 0 678 444 A1 | 10/1995 | European Pat. Off. | B62L 3/02 |
| 0 709 284 A2 | 5/1996 | European Pat. Off. | B62L 3/02 |
| 731018 A2 | 9/1996 | European Pat. Off. | |
| 812762 A1 | 12/1997 | European Pat. Off. | |
| 49-89060 | 8/1974 | Japan . | |
| 50-52739 | 5/1979 | Japan | B62L 1/06 |
| 57-19239 | 2/1982 | Japan | F16D 65/06 |
| 63-100395 | 6/1988 | Japan | B62L 1/10 |
| 5-16865 | 1/1993 | Japan | B62L 3/02 |
| 9301878 | 6/1995 | Netherlands | F16C 1/10 |
| 334994 | 1/1997 | Taiwan . | |
| 95/10445 | 4/1995 | WIPO | B62L 3/00 |

*Primary Examiner*—Chris Schwartz
*Attorney, Agent, or Firm*—James A. Deland

[57] ABSTRACT

A brake apparatus includes a brake arm, a brake pad coupling component disposed on the brake arm for receiving a brake resistive force from contact between the brake pad and a wheel rim, and a control element coupling component coupled to the brake arm for receiving a brake control force from a control element. A brake force control mechanism is coupled between the brake pad coupling component and the control element coupling component for allowing relative movement between the brake pad coupling component and the control element coupling component when both the brake resistive force and the brake control force exceed particular nonzero values.

49 Claims, 16 Drawing Sheets

BICYCLE BRAKE DEVICE

CROSS REFERENCE TO RELATED APPLICATION

This application is a continuation-in-part of application Ser. No. 08/857,091 filed May 15, 1997 now abandoned.

BACKGROUND OF THE INVENTION

The present invention relates to a bicycle brake device with which brake shoes are pressed against a wheel to effect braking by moving an inner cable positioned inside an outer casing.

A bicycle brake device generally involves the pressing of brake shoes against a wheel to effect braking by using a brake lever provided to the handlebar to move an inner cable positioned inside an outer casing. The brake shoes are supported by a pair of brake links, and the brake links usually are operated by one of two methods: center pull and side pull. In the center-pull type of brake device, which is used primarily in cantilevered brake devices, an inner cable that is branched in two is attached to the distal ends of the two brake links, and the outer casing is attached to the bicycle frame. In the side-pull type of brake device, used primarily in caliper type brake devices, the inner cable and the outer casing each are attached to a brake link.

Cantilevered brake devices with the same cable connection configuration as the side-pull type of brake device (that is, the inner cable and the outer casing each are attached to a brake link) have been put to practical use in recent years. These are high-performance brake devices with improved braking performance, and the change in the braking force with respect to the amount of movement of the inner cable (cable stroke) after the brake shoes contact the rim (hereinafter referred to as the braking characteristic) is greater than with a conventional design. As a result, the braking force tends to increase suddenly with only very slight brake lever operation. This makes braking difficult for a beginner who is unfamiliar with the brake lever operation. Also, if the braking force on the rear wheel increases suddenly, then when fine brake lever operation is impossible because of the gap between the brake shoes and the wheel in a cross-country race, for example, the rear wheel will slip and the bicycle will be difficult for even an advanced rider to control.

One possible way to prevent the above problem is to reduce the braking characteristic of the brake lever during braking. This has been put into practice in the operating force transmission device disclosed in Japanese Laid-Open Patent Application 63-203491. This operating force transmission device is provided with a control spring in the cable axial direction somewhere along the operating cable, which is composed of an inner cable and an outer casing, and is also provided with an adjuster for adjusting the spring force of the control spring. This control spring bends under the brake actuation load, so the output with respect to the input to the brake links is reduced, which allows the braking characteristic to be decreased.

If an operating force transmission device such as this is provided at some point along the operating cable, then when the spring force (bias force) at which the control spring begins to bend is suitably adjusted, the control spring will begin to bend during braking when the tension on the cable becomes greater than the biasing force of the control spring. As a result, the braking characteristic will be smaller, and sudden increases in the braking force during braking can be suppressed even with a high-performance brake device. Of course, the braking characteristic generally varies with the type of the brake device, its shape, and other such factors. Accordingly, the desired braking characteristic during braking will not be obtained unless a transmission device that matches the braking characteristic for the brake device in question is provided somewhere along the operating cable. Unfortunately, since the transmission device is provided separately from the brake device along the operating cable, a beginner could mistakenly mount a transmission device intended for a brake device with a different braking characteristic along the operating cable, in which case the desired braking characteristic during braking will not be obtained, and the brake actually may be more difficult to operate. Furthermore, the space in which the operating cable is laid is frequently relatively narrow so that the inner cable can move smoothly through the outer casing. Consequently, if a transmission device that is long in the cable axial direction is provided somewhere along the operating cable, then the degree of freedom with which the operating cable can be positioned will be reduced, making the operating cable layout more difficult to design.

SUMMARY OF THE INVENTION

The present invention is directed to a bicycle brake device which ensures a desired braking characteristic without impeding proper cable layout. In one embodiment of the present invention, a brake apparatus includes a brake arm, a brake pad coupling component disposed on the brake arm for receiving a brake resistive force from contact between the brake pad and a wheel rim, and a control element coupling component coupled to the brake arm for receiving a brake control force from a control element. A brake force control mechanism is coupled between the brake pad coupling component and the control element coupling component for allowing relative movement between the brake pad coupling component and the control element coupling component when both the brake resistive force and the brake control force exceed particular nonzero values.

In a more specific embodiment, the brake arm includes a pivot coupling portion disposed on one of an upper portion and a lower portion of the brake arm for pivotably coupling the brake arm to a mounting member, the brake pad coupling component is disposed on an intermediate portion of the brake arm, and the control element coupling component is disposed on the other one of the upper portion and the lower portion of the brake arm. In this case the brake force control mechanism includes a swing link swingably coupled between the brake arm and the control element coupling component, and a biasing mechanism for biasing the swing link to an initial position so that the swing link remains in the initial position until both the brake resistive force and the brake control force exceed the particular nonzero values. At that time the swing link may swing relative to the brake arm, thus reducing the braking force applied to the wheel rim. The range of motion of the swing link may be limited so that the original braking characteristic may be restored, resulting in greater braking force, when the swing link reaches the end of its range of motion. The brake force control mechanism may further include a bias force varying mechanism for varying a bias force of the biasing mechanism. If the biasing mechanism is formed as a spring, then the bias force varying mechanism may be formed as a cam which engages an end of the spring. In any event, since the brake force control mechanism is provided on the braking device itself, the user need not be concerned with the compatibility of a cable-mounted brake force control mechanism. Also, since no extra devices are provided to the operating cable, the operating cable is easy to lay out.

In yet another embodiment of the present invention, the brake arm includes a rotational support component for pivoting around a pivot axis, wherein the brake pad coupling component comprises a pivot link that pivots around the pivot axis relative to the brake arm. In this case the brake force control mechanism includes a spring disposed between the pivot link and the brake arm. If desired, a spring bias adjustment mechanism may be provided for adjusting a biasing force of the spring.

The present invention can be applied to a side-pull type of brake as well. In this case the brake pad coupling component is disposed on one of an upper portion and a lower portion of the brake arm, the control element coupling component is disposed on the other one of the upper portion and the lower portion of the brake arm, and the brake arm includes a pivot coupling portion disposed on an intermediate portion of the brake arm for pivotably coupling the brake arm to a mounting member. The brake force control mechanism then may be disposed on the upper portion of the brake arm, and the brake force control mechanism may have a construction similar to that described above.

In another embodiment of the present invention, the brake pad coupling component may include a pin slidably fitted within an opening formed in a shoe attachment component of the brake arm for attaching a brake shoe to the shoe attachment component. A stop member may be attached to the pin for limiting sliding displacement of the pin relative to the shoe attachment component. In this embodiment the brake force control mechanism may be formed as a spring disposed between the brake shoe and the shoe attachment component for biasing the brake shoe to an initial position. The brake shoe will slide relative to the brake arm, and hence the control element coupling component, when both the brake resistive force and the brake control force exceed the particular nonzero values.

DETAILED DESCRIPTION OF THE EMBODIMENTS

Figure 1:
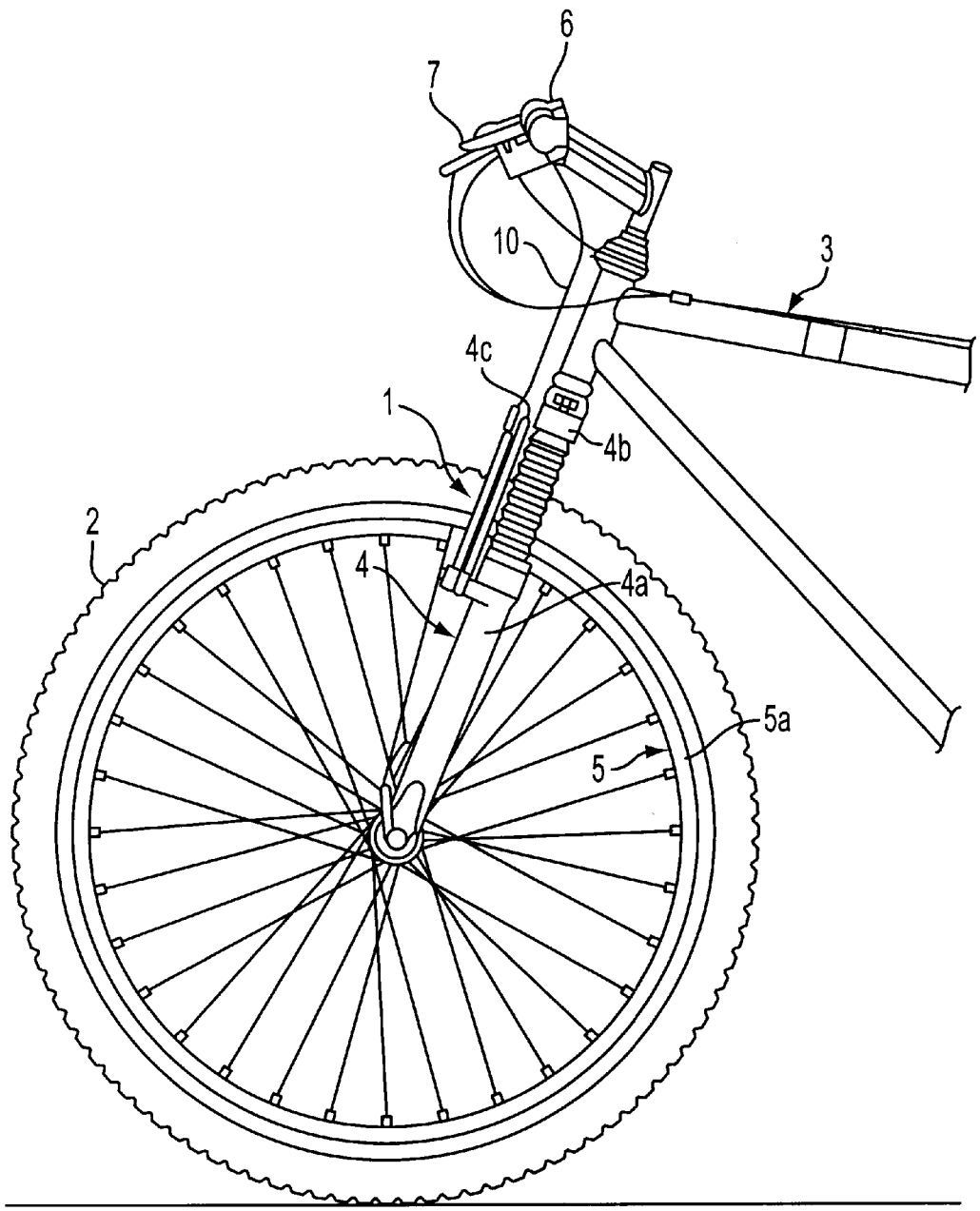
FIG. 1 is a side view of a portion of a bicycle to which a particular embodiment of a brake device according to the present invention has been applied.
Figure 2:
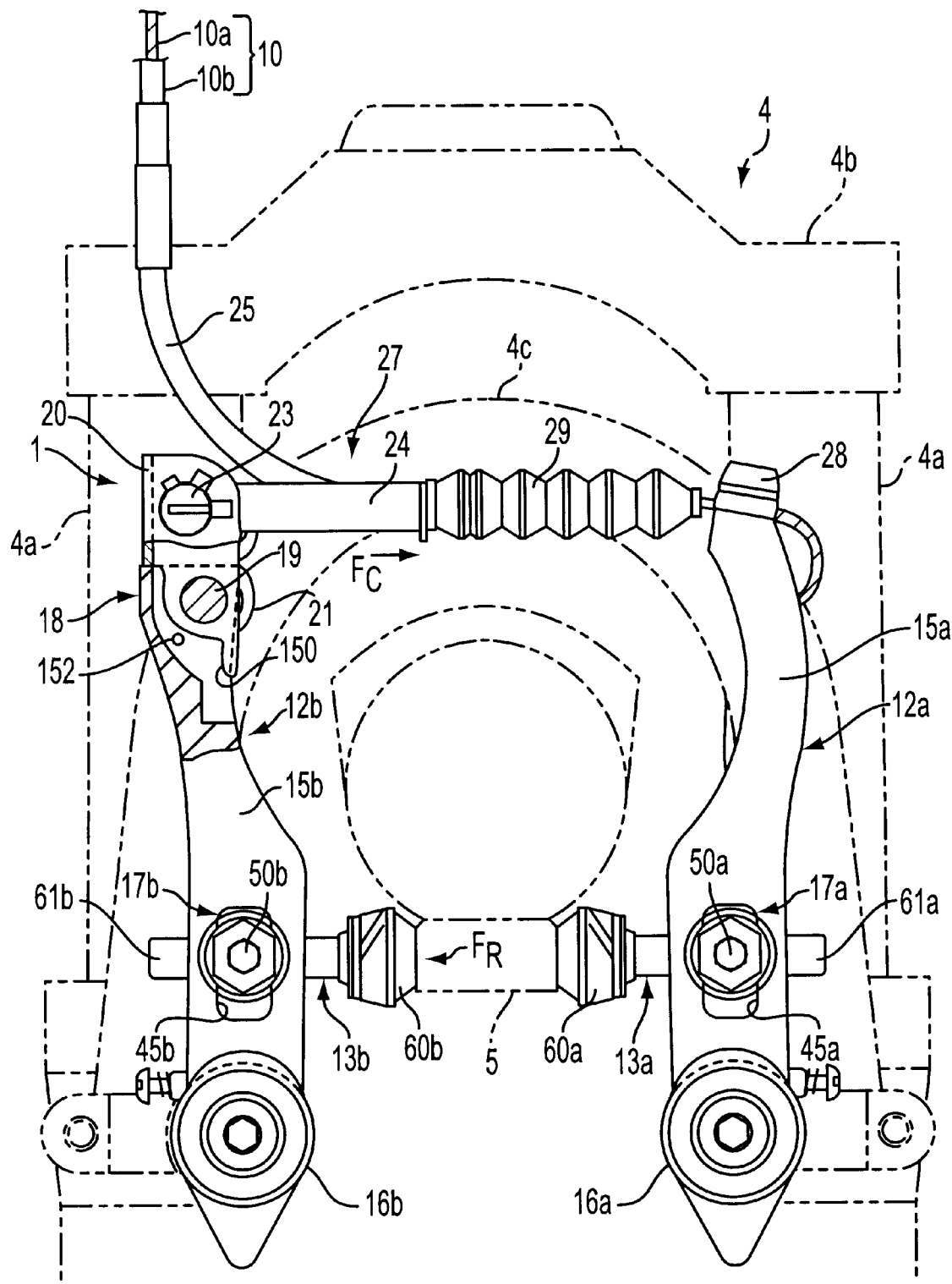
FIG. 2 is a front view of a particular embodiment of a brake device according to the present invention.
Figure 5:
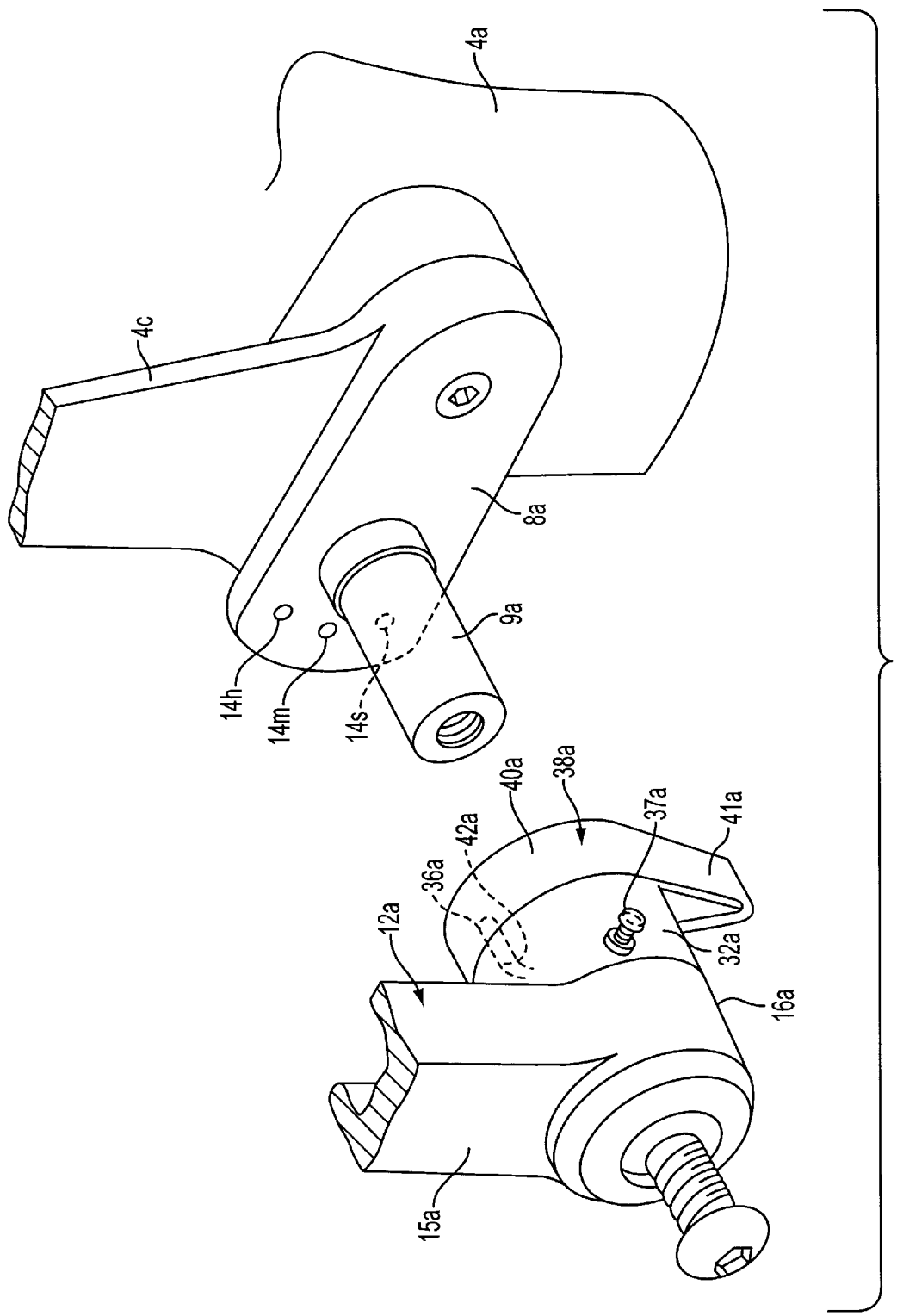
FIG. 5 is a partially exploded view showing the mounting of the brake device of FIG. 2 to a bicycle frame.

In FIGS. 1 and 2, a side-pull cantilevered brake device 1 pertaining to an embodiment of the present invention is used for a front wheel, for example, and displays a braking action when pressed against both lateral surfaces 5a of the rim 5 of a front wheel 2. The brake device 1 is swingably supported by the front fork 4 of a frame 3. The front fork 4 is an air/oil or elastomer type of suspension fork, for example, which allows shocks from the road surface to be absorbed. The front fork 4 has a pair of left and right suspension components 4a, an attachment component 4b that is used to attach the pair of suspension components 4a, and a stabilizer 4c that is used to reinforce the suspension components 4a. The stabilizer 4c branches into a shape resembling an inverted U, is fixed at its lower ends at some point along the suspension components 4a, and has a pair of left and right seats 8a and 8b at its two lower ends. As shown in FIG. 5, these seats 8a and 8b are provided with forward-protruding, stepped fixing pins 9a and 9b, respectively (only 9a is shown in the figure). The seats 8a and 8b are also provided with three stop holes 14h, 14m, and 14s that are arranged in a circular arc centering on the fixing pins 9a and 9b and that are used to stop a brake release-use torsion coil spring (discussed below) provided to the brake device 1.

Figure 3:
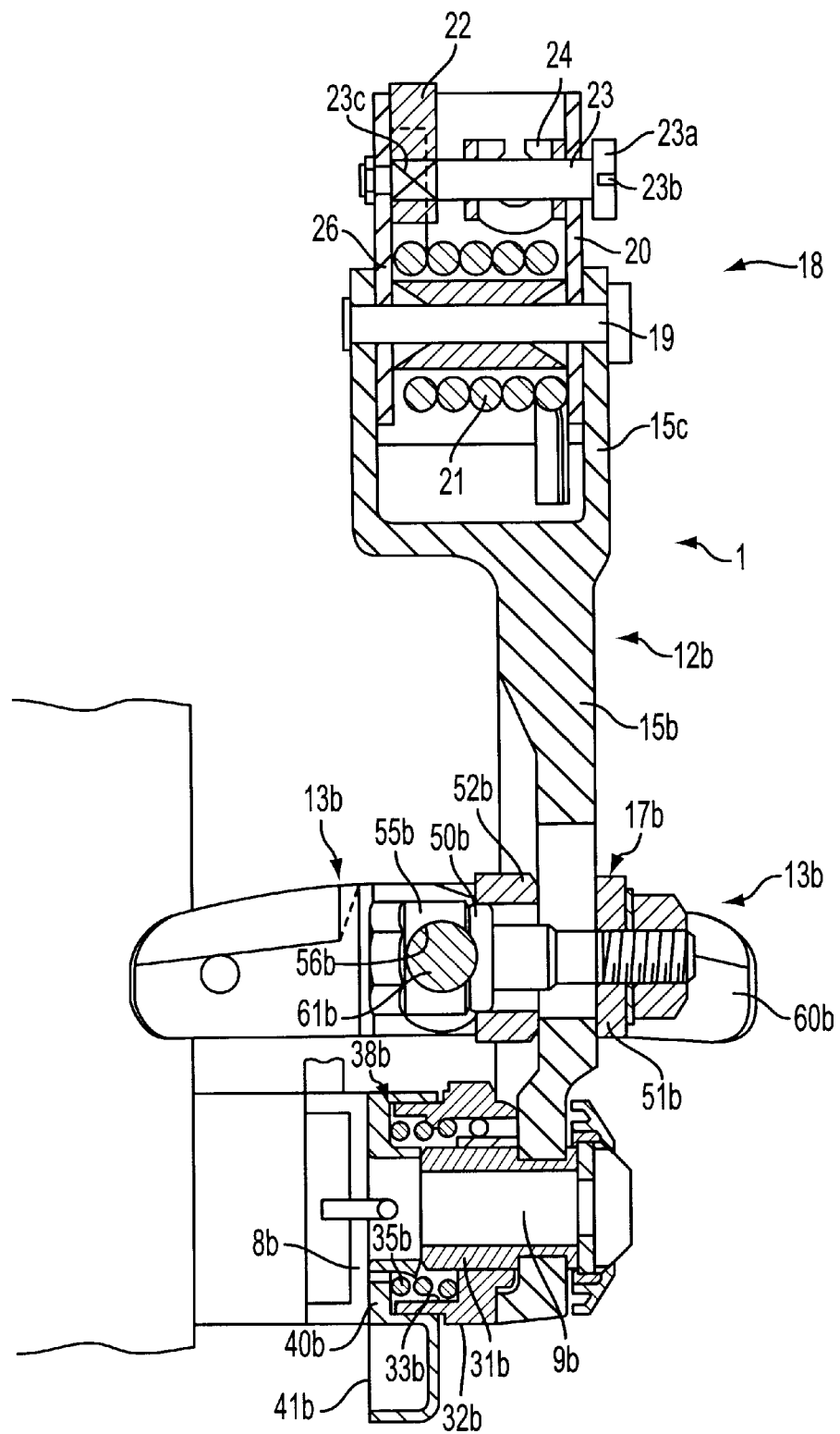
FIG. 3 is a cross sectional view of the brake device shown in FIG. 2.

As shown in FIGS. 1 through 3, the brake device 1 is linked to the distal end of an operating cable 10, the base end of which is linked to a brake lever 7 provided to the handlebar 6. The operating cable 10 has an inner cable 10a, the base end of which is stopped at the brake lever 7, and an outer casing 10b that is stopped at the attachment frame of the brake lever 7 and through the inside of which the inner cable 10a moves.

The brake device 1 has a pair of left and right brake links 12a and 12b that swing. Brake shoes 13a and 13b are attached facing each other at some point along the brake links 12a and 12b such that they can be adjusted. Brake shoes 13a and 13b receive the brake resistive force $F_R$ from contact between the brake pads and the lateral surfaces 5a of the rim 5. The brake links 12a and 12b have brake arms or link bodies 15a and 15b, respectively, in the form of plates that extend upward and have been thinned on their back side. Rotational support components (pivot coupling portions) 16a and 16b that are rotatably supported on mounting members in the form of fixing pins 9a and 9b extending from the seats 8a and 8b are provided to the base ends of the link bodies 15a and 15b. In the middle portions are provided shoe attachment components 17a and 17b that are used to attach the brake shoes 13a and 13b.

Figure 4:
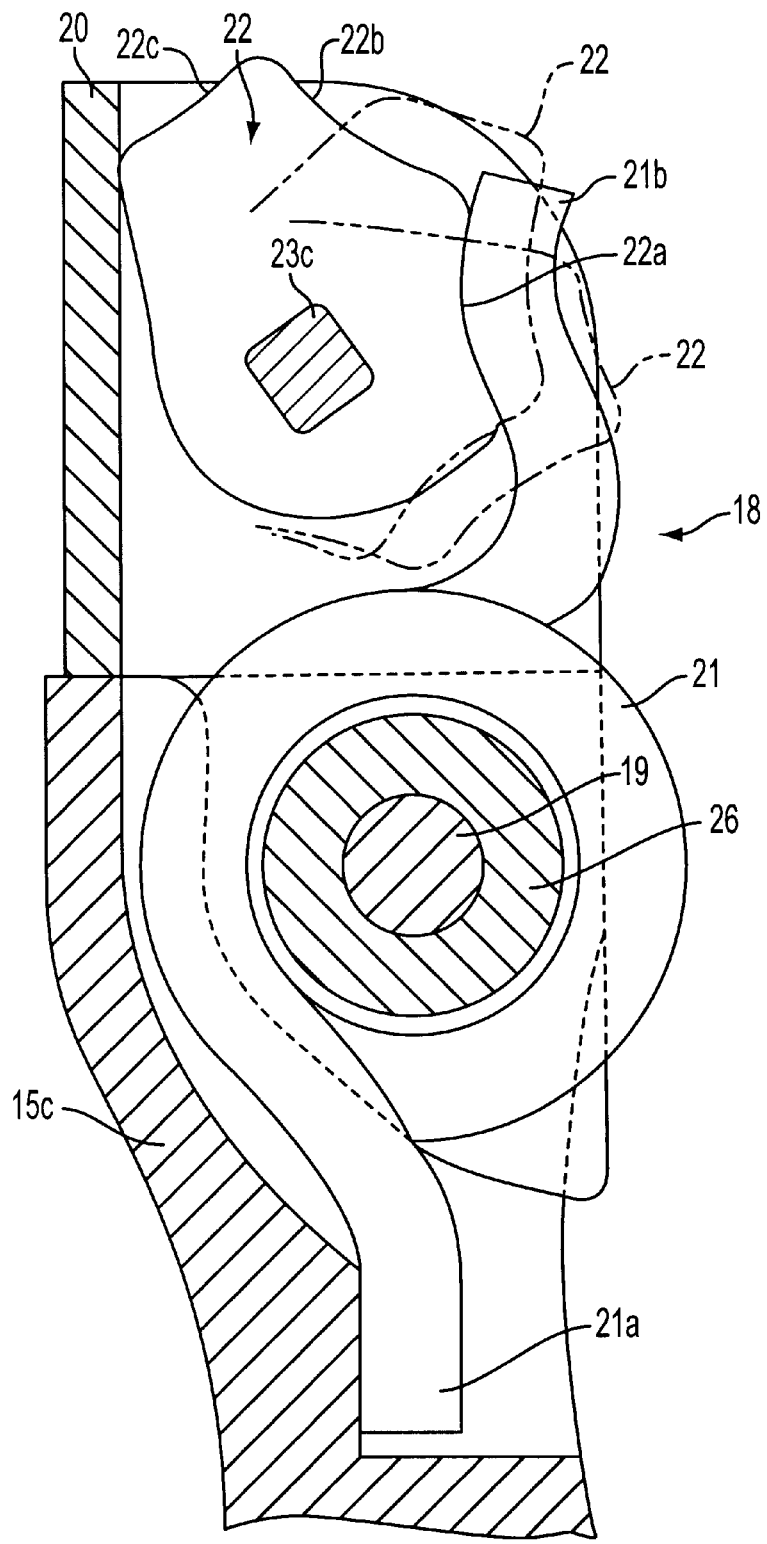
FIG. 4 is a detailed cross sectional view of a particular embodiment of a braking characteristic varying mechanism according to the present invention used in the brake device shown in FIG. 2.

A bracket 15c with a C-shaped cross section is formed on the distal end of the link body 15b. A brake force control mechanism 18 is provided to this bracket 15c. As shown in FIGS. 2 through 4, the brake force control mechanism 18 has a swing link 20 that is swingably supported by a swing shaft 19 fitted in the longitudinal direction to the bracket 15c, a biasing mechanism such as a torsion coil spring 21 that energizes the swing link 20, and a movement cam 22 that adjusts the biasing force (spring force) of the torsion coil spring 21 and thus functions as a bias force varying mechanism.

The swing link 20 is a member with a C-shaped cross section, the lower portion of which is supported by the swing shaft 19, and to the upper portion of which is fitted in the longitudinal direction a linking shaft 23. A cable hook 24 that is used to keep the operating cable 10 from jutting out too much from the device 1 is rotatably linked to the linking shaft 23. Cable hook 24 receives a brake control force $F_C$ from operating cable 10. The distal end of a tubular inner guide 25 that is curved at approximately 90 degrees and that is used to prevent the kinking of the operating cable 10 is attached to this cable hook 24. The outer casing 10b of the operating cable 10 is attached to the base end of the inner guide 25. The cable hook 24 and inner guide 25 constitute a first control element coupling component or first stop component 27.

The torsion coil spring 21 is wound around the outer periphery of a tubular spring guide 26 fitted on the outer peripheral side of the swing shaft 19. One end of the torsion coil spring 21 extends in a curve slightly to the outside, and this end 21a is attached to the bracket 15c. The other end of the torsion coil spring 21 curves around toward the outside for 90 degrees, and then curves slightly back in the opposite direction, and this curved end 21b is attached to one of the three cam faces 22a through 22c formed on the outer periphery of the movement cam 22.

The movement cam 22 is non-rotatably mounted on the linking shaft 23. A large-diameter flange 23a is formed at the front end of the linking shaft 23, and a tool engaging groove 23b used for rotational operation is formed on the front surface of the flange 23a. An anti-rotation component 23c that has a square cross section is formed at the rear end of the linking shaft 23, and the movement cam 22 is non-rotatably mounted thereto. The three cam faces 22a through 22c are formed on the outer peripheral surface of the movement cam 22. The distance from the center of the linking shaft 23 to each of the cam faces 22a through 22c gradually increases. Each of the cam faces 22a through 22c is slightly concave so as to match the curve of the end 21b of the torsion coil spring 21.

A second control element coupling component or second stop component 28 that attaches the inner cable 10a is provided to the distal end of the link body 15a. The inner cable 10a is passed through the inside of the inner guide 25 and is fastened by a screw to the second stop component 28 at the distal end of the link body 15a. An expanding and contracting bellows 29 that is used to protect the inner cable 10a is positioned between the cable hook 24 and the second stop component 28.

Rotational support components 16a and 16b, as shown in FIG. 3 (only the b side is shown), have tubular bushings 31a and 31b that are flared and fixed to the base ends of the link bodies 15a and 15b and that are fitted to the fixing pins 9a and 9b. Spring covers 32a and 32b in the form of bottomed hollow cylinders are fixed to the outer periphery of the bushings 31a and 31b. Tubular spaces 33a and 33b are formed between the spring covers 32a and 32b and the bushings 31a and 31b, and torsion coil springs 35a and 35b that energize the brake links 12a and 12b to the brake release side are housed within these spaces 33a and 33b.

The rear ends 36a and 36b of the torsion coil springs 35a and 35b, as shown in FIG. 5 (only the a side is shown), are attached to one of the three attachment holes 14h through 14s provided to the seats 8a and 8b. Changing the attachment position at these attachment holes 14h through 14s allows the force to the brake release side to be adjusted to three levels. Also, the front ends (not shown) are attached to the bottoms of the spring covers 32a and 32b. The front end attachment positions of the torsion coil springs 35a and 35b of the brake links 12a and 12b can be moved in the peripheral direction of the fixing pins 9a and 9b by means of spring adjusting screws 37a and 37b that are threaded into the outer surfaces of the spring covers 32a and 32b.

Spring caps 38a and 38b that cover the rear ends of the torsion coil springs 35a and 35b are rotatably mounted to the rear of the spring covers 32a and 32b. The spring caps 38a and 38b have cylindrical components 40a and 40b that are fitted to the large diameter portion of the fixing pins 9a and 9b, and rotational operation components 41a and 41b that protrude outward in a triangle from the peripheral surface of the cylindrical components 40a and 40b. Through holes 42a and 42b (only the a side is shown in FIG. 5), through which the rear ends 36a and 36b of the torsion coil springs 35a and 35b pass, are formed in the bottom surfaces of the spring caps 38a and 38b, making it possible to attach the rear ends of the torsion coil springs 35a and 35b.

Thus providing the spring caps 38a and 38b allows the rear ends 36a and 36b of the torsion coil springs 35a and 35b to be disposed in any desired position by turning the spring caps 38a and 38b. Accordingly, even when there is a limit to the rotation of the brake link 12a, and the rear ends 36a and 36b of the torsion coil springs 35a and 35b cannot be inserted into the desired stop holes 14h through 14s in a natural state, the rear ends 36a and 36b can be easily inserted into the stop holes 14h through 14s merely by turning the spring caps 38a and 38b. Also, since the attachment angle of the spring caps 38a and 38b (the orientation of the distal ends of the spring caps 38a and 38b) varies with the location where the torsion coil springs 35a and 35b are attached to the stop holes 14h through 14s, the stop position of the torsion coil springs 35a and 35b, that is, the level of force to the brake release side, can be easily ascertained from the orientation of the spring caps 38a and 38b. For instance, the distal ends of the spring caps 38a and 38b will face down when the torsion coil springs 35a and 35b are attached to the stop holes 14m, will face diagonally inward when the torsion coil springs 35a and 35b are attached to the stop holes 14h, and will face diagonally outward when the torsion coil springs 35a and 35b are attached to the stop holes 14s, so the level of the force at which the brakes are returned to the release side can be easily ascertained from the orientation of the spring caps 38a and 38b.

As shown in FIGS. 2 and 3, the shoe attachment components 17a and 17b have shoe attachment bolts 50a and 50b that are inserted from the rear into slots 45a and 45b made in the center of the link bodies 15a and 51b, and washers 51a and 51b and collars 52a and 52b that are fitted to the shoe attachment bolts 50a and 50b such that they sandwich the link bodies 15a and 15b. Shoe attachment holes 56a and 56b are made in the left and right direction (perpendicular to the page in FIG. 3) in the heads 55a and 55b of the shoe attachment bolts 50a and 50b positioned at the rear of the link bodies 15a and 15b.

The brake shoes 13a and 13b have rubber shoe bodies (brake pads) 60a and 60b, and brake pad coupling components in the form of shoe attachment pins 61a and 61b that extend outward from the approximate center in the longitudinal direction of the shoe bodies 60a and 60b. The shoe bodies 60a and 60b are thinner than in the past, and are designed to deform during braking. The shoe attachment pins 61*a* and 61*b* can be inserted into the shoe attachment holes 56*a* and 56*b* made in the shoe attachment bolts 50*a* and 50*b*. Brake shoes 13*a* and 13*b* are disposed on the front fork 4 side (to the rear of) the brake links 12*a* and 12*b*, so the distance from the front fork 4 is short, and there is less moment caused by the rebound from the rim 5 that acts on the brake shoes 13*a* and 13*b*. Accordingly, twisting of the fork will not readily decrease the braking force even if a suspension fork with relatively low torsional rigidity is used. Also, since the shoe bodies 60*a* and 60*b* are themselves thinner, there is less bending distortion of the shoe bodies 60*a* and 60*b* during braking, and even less decrease in braking force.

Operation of the brake device I during braking will now be described.

Figure 6:
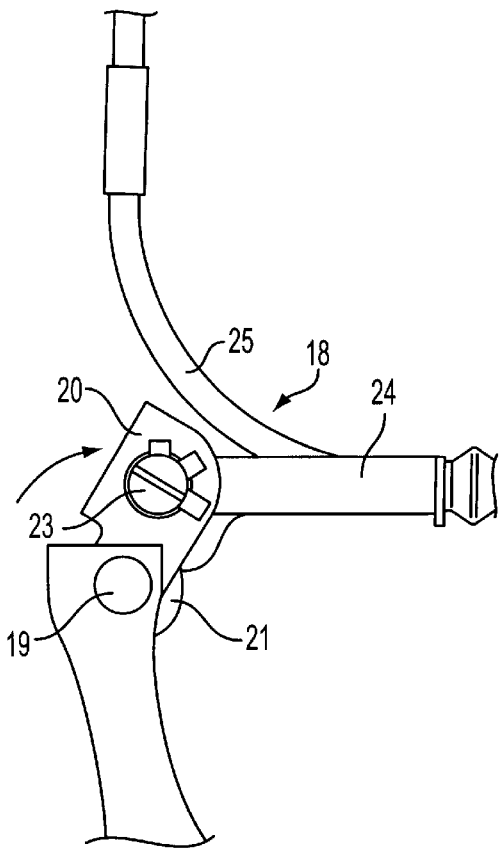
FIG. 6 is a detailed front view illustrating the operation of the brake characteristic varying mechanism shown in FIG. 4.
Figure 7:
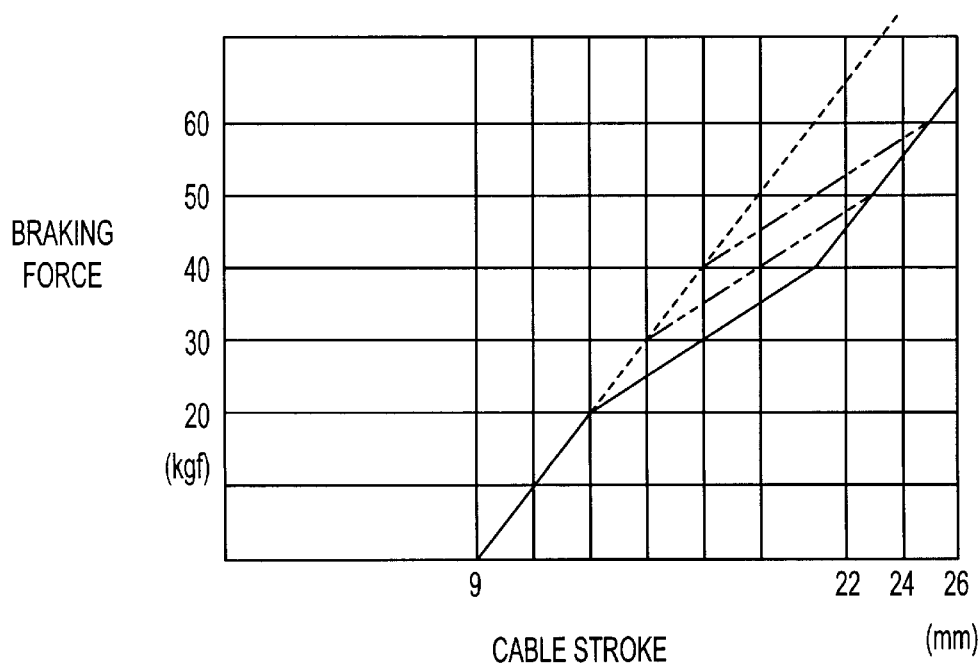
FIG. 7 is a graph illustrating the braking force characteristic of the brake device shown in FIG. 2.

When the rider operates the brake lever 7, the inner cable 10*a* is pulled into the outer casing 10*b*, the brake links 12*a* and 12*b* swing in their respective closing directions against the biasing force of the torsion coil springs 35*a* and 35*b*, and the shoe bodies 60*a* and 60*b* of the brake shoes 13*a* and 13*b* hit the lateral surfaces 5*a* of the rim 5. A braking force is generated when the shoe bodies 60*a* and 60*b* contact the lateral surfaces 5*a*. The braking force generated here is proportional to the amount of movement of the inner cable 10*a* (the cable stroke), as shown in FIG. 7. When the inner cable 10*a* is pulled further until the operating force of the inner cable 10*a* thus generated (the tension on the inner cable 10*a*) exceeds the initial biasing force of the torsion coil spring 21 of the brake force control mechanism 18 (i.e., when the net result of forces $F_C$ and $F_R$ between swing link 20 and link body 15*b* at shaft 19 exceeds the initial biasing force of spring 21), then the torsion coil spring 21 bends and the swing link 20 swings to the first stop component 27 side, as shown in FIG. 6. When the swing link 20 swings, as shown in FIG. 7, the generated braking force corresponds to the biasing force of the torsion coil spring 21, which increases with bending, and there is less change in the braking characteristic, that is, in the braking force with respect to the cable stroke (the slope of the straight line in FIG. 7). As a result, there is less change in braking force with respect to the operation of the brake lever 7. Therefore, even if the brake lever is operated excessively by a novice who is unfamiliar with the brake operation, the braking force will not increase that much, making the brake easier to operate. The swinging of the swing link 20 is complete when an abutment 150 on the swing link 20 contacts a corresponding abutment 152 in the form of a stop pin on the link body. Upon completion of this swinging, the braking characteristic returns to its original large value, and a powerful braking force is obtained.

For a novice, the movement cam 22 should be put in the position indicated by the solid lines in FIG. 4, the end 21*b* of the torsion coil spring 21 should be attached to the cam face 22*a*, and the biasing force should be adjusted so that the braking characteristic will decrease at a low braking force. However, if this adjustment is made with an advanced rider, a high braking force will not be obtained instantly. In this case, the linking shaft 23 should be turned to rotate the movement cam 22, and the end 21*b* should be attached to the cam face 22*b*, as shown by the one-dot chain line in FIG. 4, or should be attached to the cam face 22*c*, as shown by the two-dot chain line. When the movement cam 22 is thus rotated, the end 21*b* of the torsion coil spring 21 moves in the winding direction of the spring and the biasing force increases. As a result, the braking force at the point when the swing link 20 begins to swing shifts in steps to the larger side, as shown by the one- or two-dot chain line in FIG. 7. Accordingly, a high braking force is obtained at a short cable stroke. In particular, the braking effect is highest in the skid region (the region of imminent wheel lock-up), so if the braking characteristic is designed to be smaller in this skid region, the cable stroke (the amount the brake lever is operated) at this point will be longer, and the brakes will be easier to operate in the skid region.

When the brake lever 7 is released, the inner cable 10*a* slackens, the biasing force of the torsion coil springs 35*a* and 35*b* causes the brake links 12*a* and 12*b* to swing in the opening directions, the distal ends of the shoe bodies 60*a* and 60*b* of the brake shoes 13*a* and 13*b* move away from the lateral surfaces 5*a* of the rim, and the braking is released.

Since the braking characteristic can be adjusted in small increments on the brake device 1 side during braking by means of the torsion coil spring 21 and the swing link 20 provided to the link body 15*b*, the desired braking characteristic corresponding to the brake device 1 can be reliably obtained during braking. Also, since no extra devices are provided to the operating cable 10, the operating cable 10 is easy to lay out.

In the mounting of the brake device I to the fixing pins 9*a* and 9*b*, the rotational support components 16*a* and 16*b* are fitted to the fixing pins 9*a* and 9*b*, and the rotational operation components 41*a* and 41*b* are gripped with the fingers to position the rear ends 36*a* and 36*b* of the torsion coil springs 35*a* and 35*b* at the desired stop holes 14*h* through 14*s*. If the rotational support components 16*a* and 16*b* are fitted all the way back in this state, the rear ends 36*a* and 36*b* can be inserted into stop holes 14*h* through 14*s*.

Since the brake shoes 13*a* and 13*b* are disposed on the front fork 4 side of the brake links 12*a* and 12*b* in order to maintain a high braking force, the rear ends of the shoe bodies 60*a* and 60*b* hit the stabilizer 4*c*, which limits the rotation of the brake links 12*a* and 12*b* to the brake release side. However, since the stop position of the rear ends 36*a* and 36*b* of the torsion coil springs 35*a* and 35*b* can be freely varied by means of the rotational operation components 41*a* and 41*b*, one end of the torsion coil springs 35*a* and 35*b* can be reliably inserted into one of the stop holes 14*h* through 14*s* even if the rotation of the brake links 12*a* and 12*b* is limited.

Figure 8:
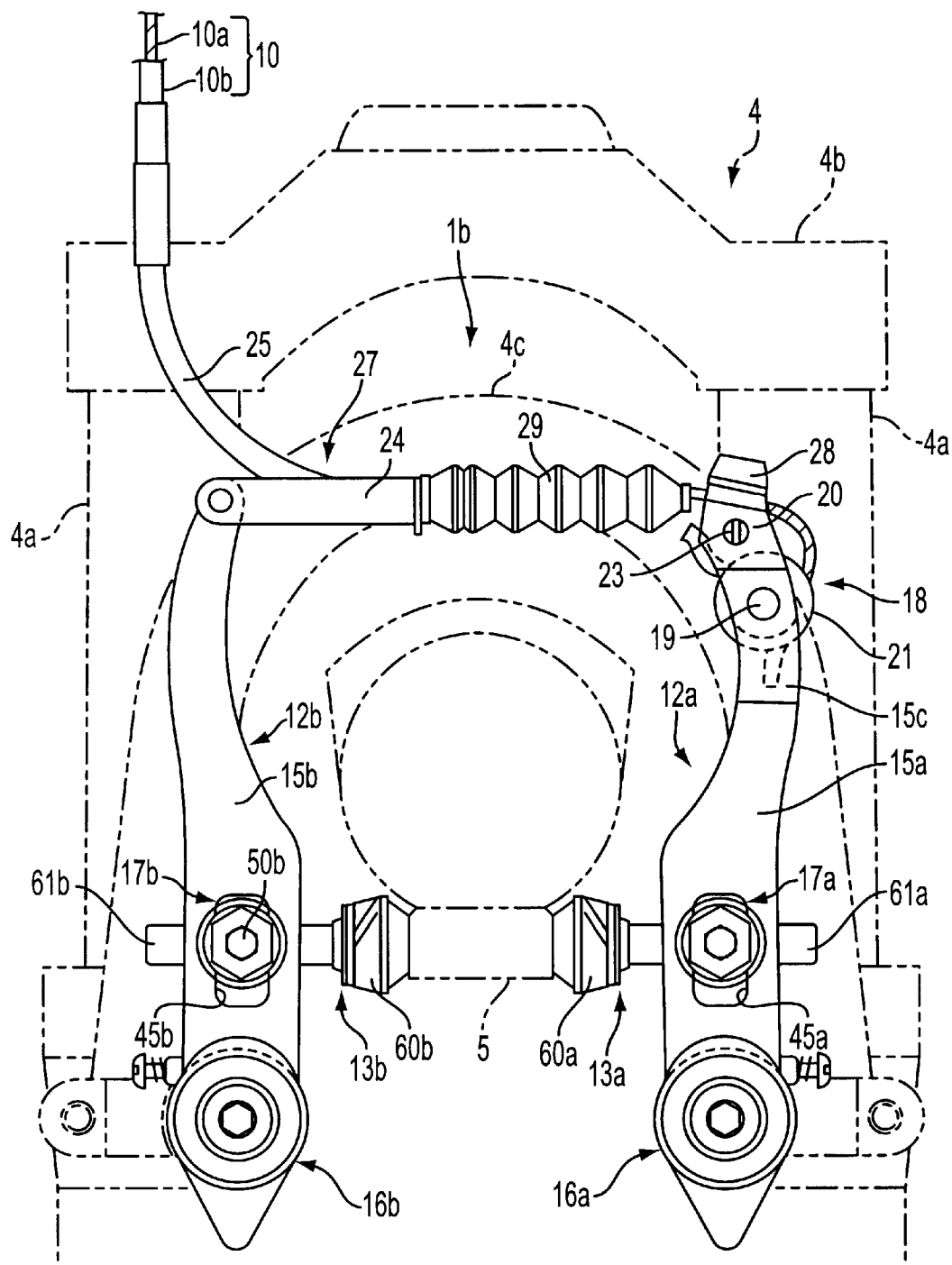
FIG. 8 is a front view of an alternative embodiment of a brake device according to the present invention.

As shown in FIG. 8, the brake force control mechanism 18 may be provided to the link body 15*a* side rather than to the link body 15*b* side as in the embodiment shown in FIG. 2. With the brake device 1*b* in this embodiment, the cable hook 24 is rotatably linked to the distal end of the link body 15*b*, and the bracket 15*c* is formed at the distal end of the link body 15*a*. As with the embodiment shown in FIG. 2, the brake force control mechanism 18 has a swing link 20 that is swingably supported on a swing shaft 19 that is fitted in the longitudinal direction to the bracket 15*c*, a torsion coil spring 21 that energizes the swing link 20 inward, and a movement cam (not shown) that adjusts the biasing force (spring force) of the torsion coil spring 21. The rest of the structure and operation in this embodiment is the same as the embodiment shown in FIG. 2, so its description will be omitted. This embodiment has the same merits as the embodiment shown in FIG. 2.

Figure 9:
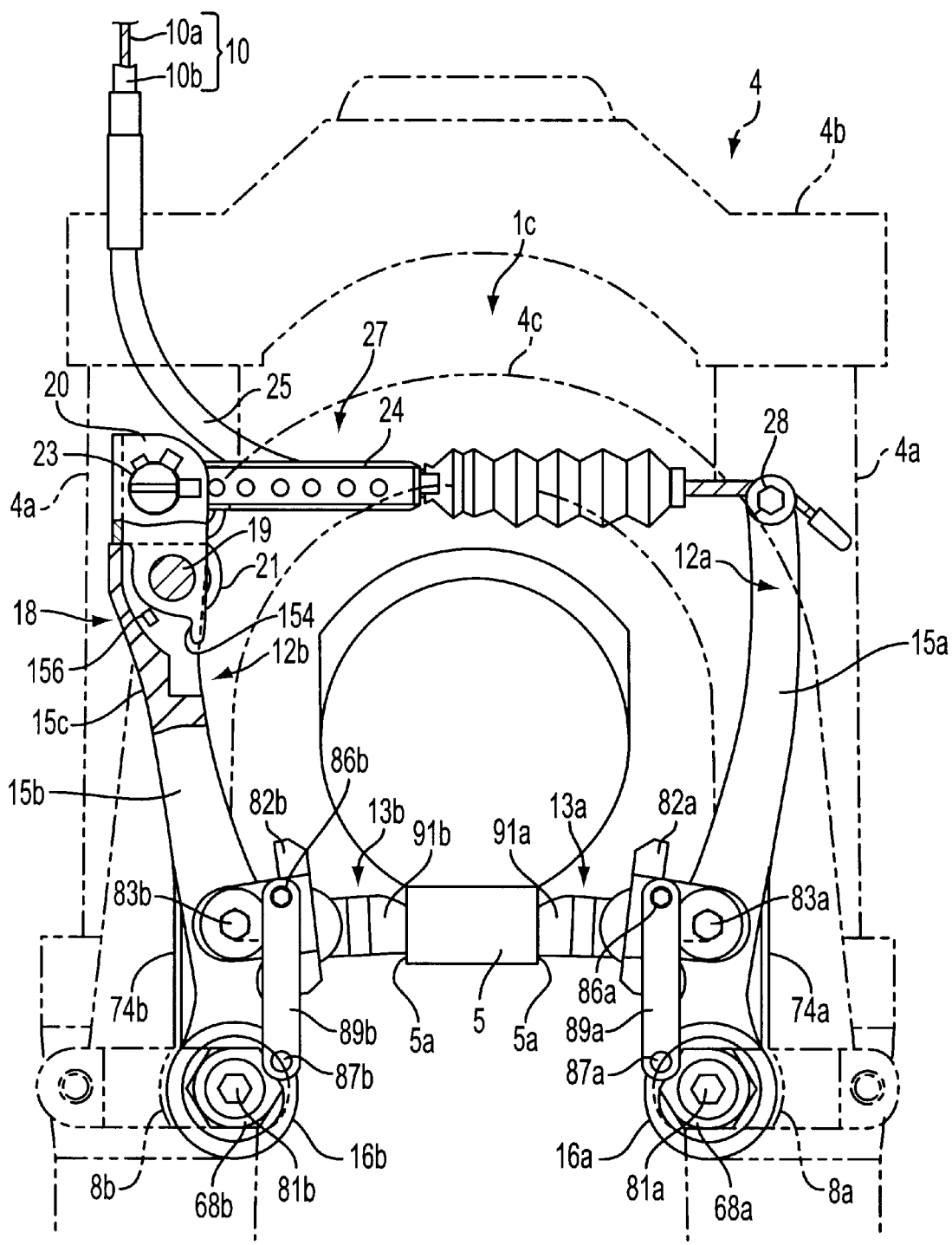
FIG. 9 is a front view of another alternative embodiment of a brake device according to the present invention.
Figure 10:
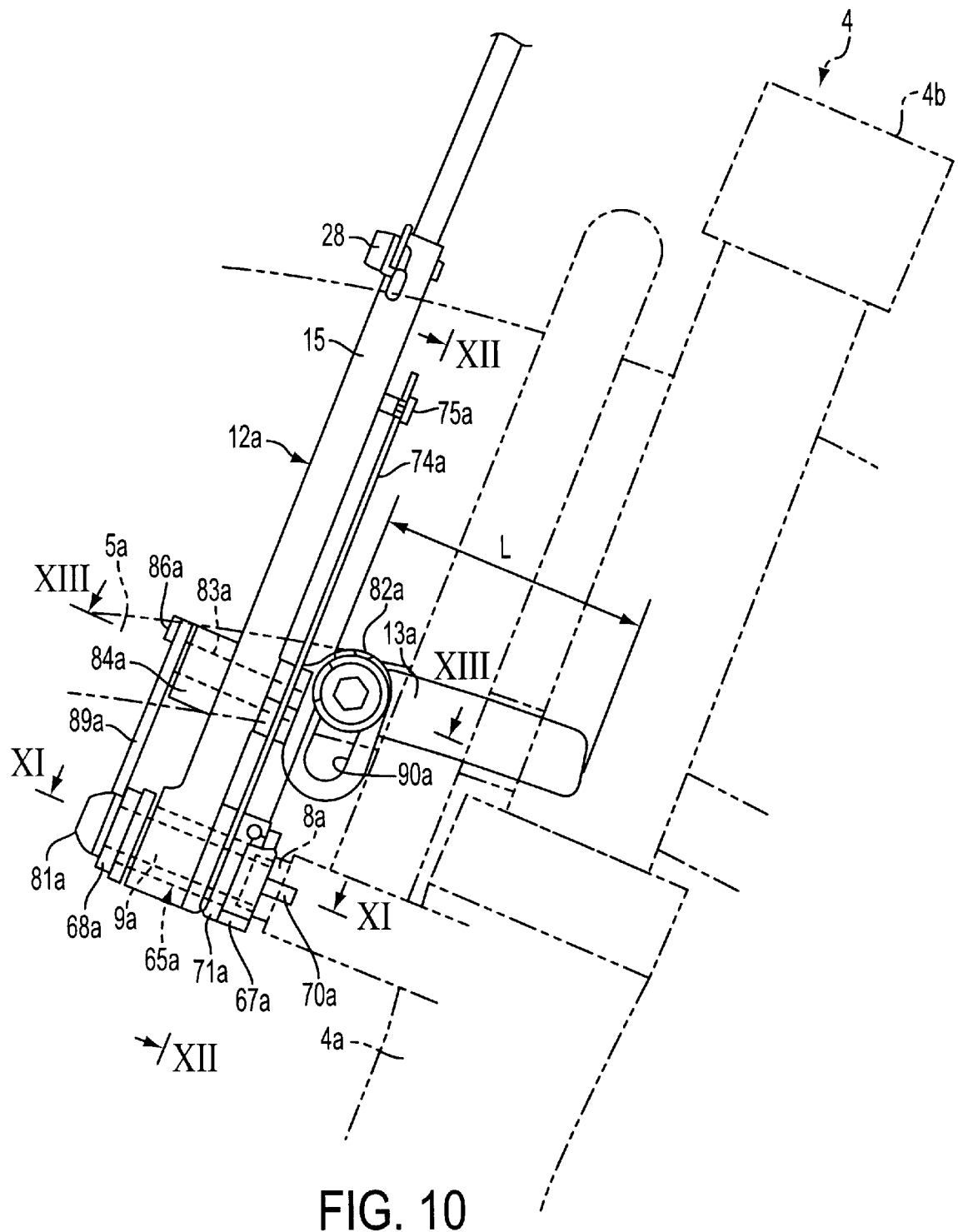
FIG. 10 is a side view of the brake device shown in FIG. 9.

With the above two embodiments, the attitude of the brake shoes 13*a* and 13*b* varied with the swinging, but the brake force control mechanism 18 may also be provided to a brake device 1*c* having shoe attachment components 17*a* and 17*b* with a four-link structure, as shown in FIGS. 9 and 10. FIG. 10 and subsequent figures show only the left-side members (the right-side member is shown in FIG. 9).

Figure 11:
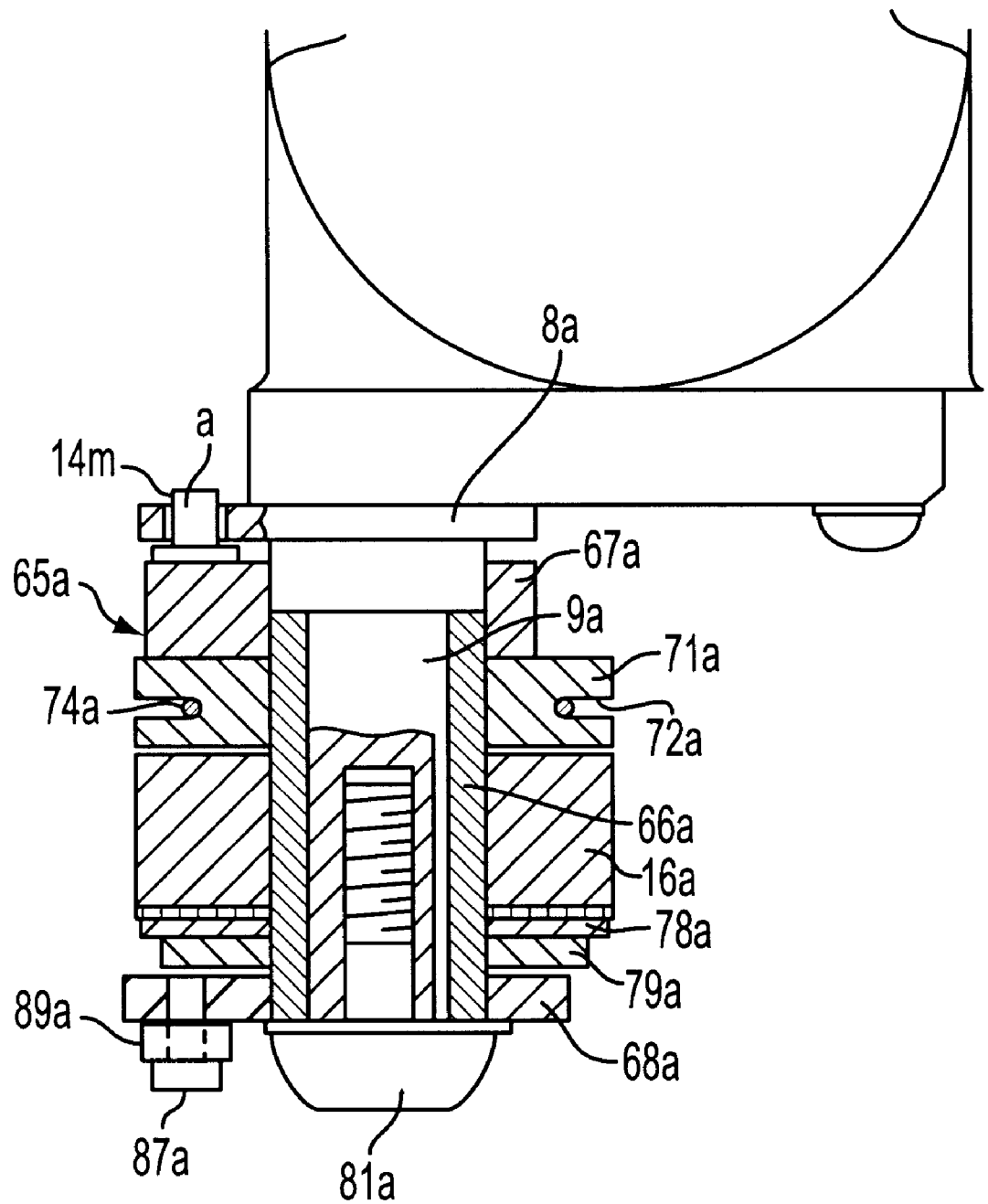
FIG. 11 is a view taken along line XI—XI in FIG. 10.

As shown in FIGS. 9 and 10, such a brake device 1c has a pair of left and right swinging brake links 12a and 12b. Shoe attachment components 17a and 17b that are used to attach the brake shoes 13a and 13b are provided to the lower portions of the brake links 12a and 12b. The brake links 12a and 12b have link bodies 15a and 15b, respectively, that are in the form of plates which extend upward. Rotational support components 16a and 16b are provided to the base ends of the link bodies 15a and 15b. As shown in FIG. 11, the rotational support components 16a and 16b are rotatably supported on link bases 65a and 65b that are non-rotatably fitted to the fixing pins 9a and 9b extending from the seats 8a and 8b. A bracket 15c is formed at the distal end of the link body 15a, and a brake force control mechanism 18 is provided to the bracket 15c. This structure is the same as in the embodiment shown in FIG. 2, so its description will be omitted. A second attachment component 28 is provided to the distal end of the link body 15b.

Figure 12:
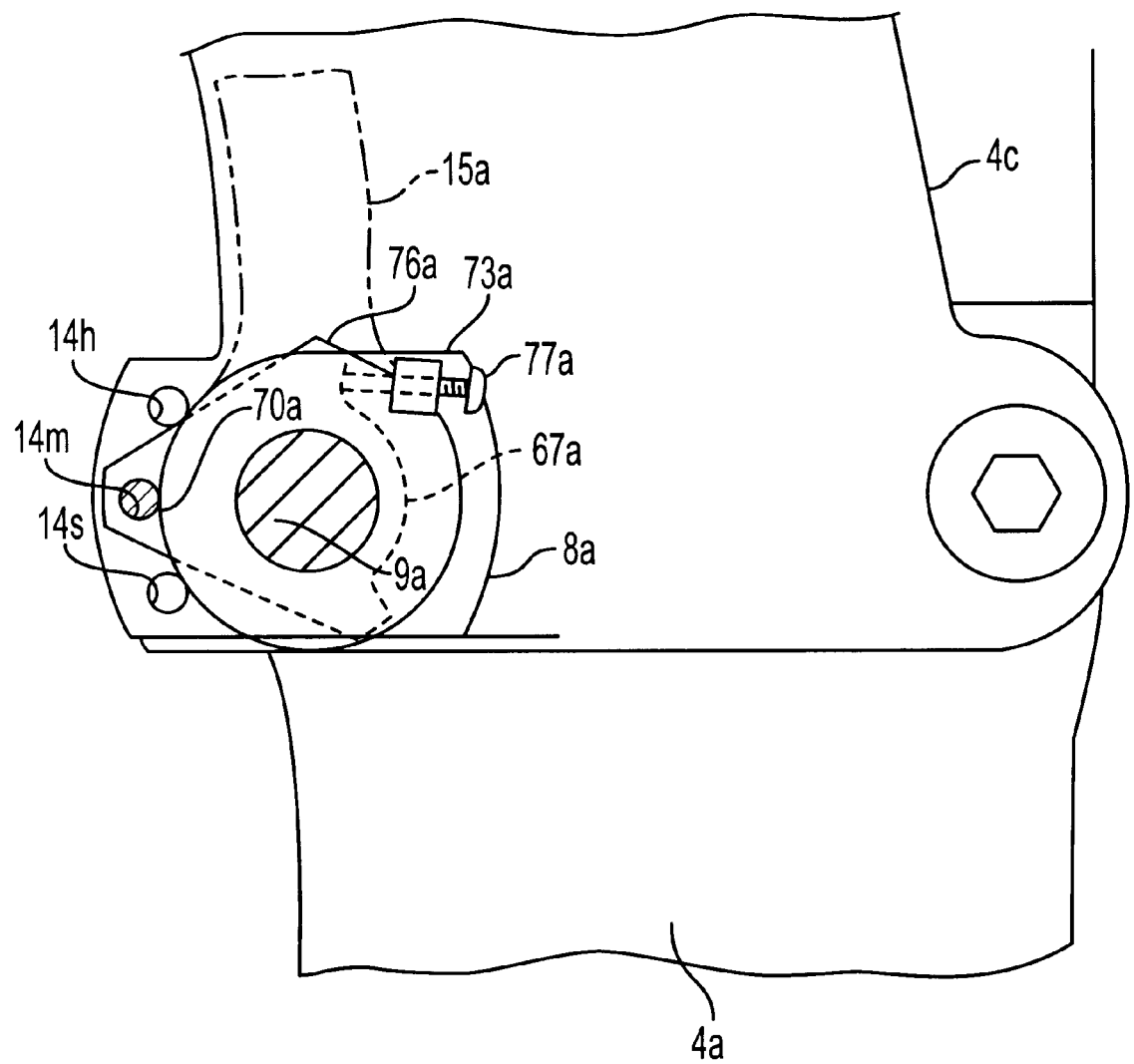
FIG. 12 is a view taken along line XII—XII in FIG. 10.

The link bases 65a and 65b are disposed around the outer periphery of the fixing pins 9a and 9b. Link bases 65a and 65b have tubular components 66a and 66b, the base ends of which hit the stepped portions of the fixing pins 9a and 9b. Stop components 67a and 67b that are fitted and fixed to the base end outer periphery of the tubular components 66a and 66b. Teardrop-shaped arms 68a and 68b are fitted and fixed to the distal end outer periphery. The rotational support components 16a and 16b of the link bodies 15a and 15b are rotatably supported by these tubular components 66a and 66b. The stop components 67a and 67b are roughly triangularly shaped members, as shown in FIG. 12, the insides of which are provided with stop pins 70a and 70b that go through one of the stop holes 14h through 14s. Passing these stop pins 70a and 70b through one of the stop holes 14h through 14s maintains the specified attachment attitude of the link bases 65a and 65b.

Spring holders 71a and 71b are provided between the link bodies 15a and 15b and the stop components 67a and 67b (FIG. 11) around the outer periphery of the link bases 65a and 65b. The spring holders 71a and 71b have grooves 72a and 72b formed in the peripheral direction, and adjustment components 73a and 73b (FIG. 12) are located on the outer periphery. The base ends of return springs 74a and 74b are wound and fixed inside the grooves 72a and 72b. The distal ends of the return springs 74a and 74b extend upward, and are stopped by stop pins 75a and 75b (FIG. 10) that protrude from the back side in the middle of the link bodies 15a and 15b. The return springs 74a and 74b bias the link bodies 15a and 15b so that they rotate outward. Adjustment screws 77a and 77b capable of hitting protrusions 76a and 76b formed on the outer periphery of the stop components 67a and 67b are threaded into the adjustment components 73a and 73b. The attitude of the left and right brake links 12a and 12b is adjusted by moving these adjustment screws 77a and 77b in or out, and this allows the gap between the left and right brake shoes 13a and 13b and the lateral surfaces 5a of the rim 5 to be adjusted.

Pairs of lock nuts 78a and 78b and 79a and 79b (FIG. 11) are threaded around the outer periphery of the link bases 65a and 65b between the rotational support components 16a and 16b and the arms 68a and 68b. The lock nuts 78a, 78b, 79a, and 79b serve to restrict the movement of the rotational support components 16a and 16b in the axial direction. Attachment bolts 81a and 81b are fastened to the distal ends of the fixing pins 9a and 9b. The attachment bolts 81a and 81b serve to suppress movement of the link bases 65a and 65b in the axial direction.

As shown in FIGS. 9 and 10, shoe mounting links 82a and 82b, which constitute the shoe attachment components 17a and 17b that are used to attach the brake shoes 13a and 13b to the brake device 1, are attached nearly horizontally to the middle portion in the vertical direction of the link bodies 15a and 15b. The shoe mounting links 82a and 82b are rotatably linked to the link bodies 15a and 15b by attachment pins 83a and 83b that pass through these components.

Figure 13:
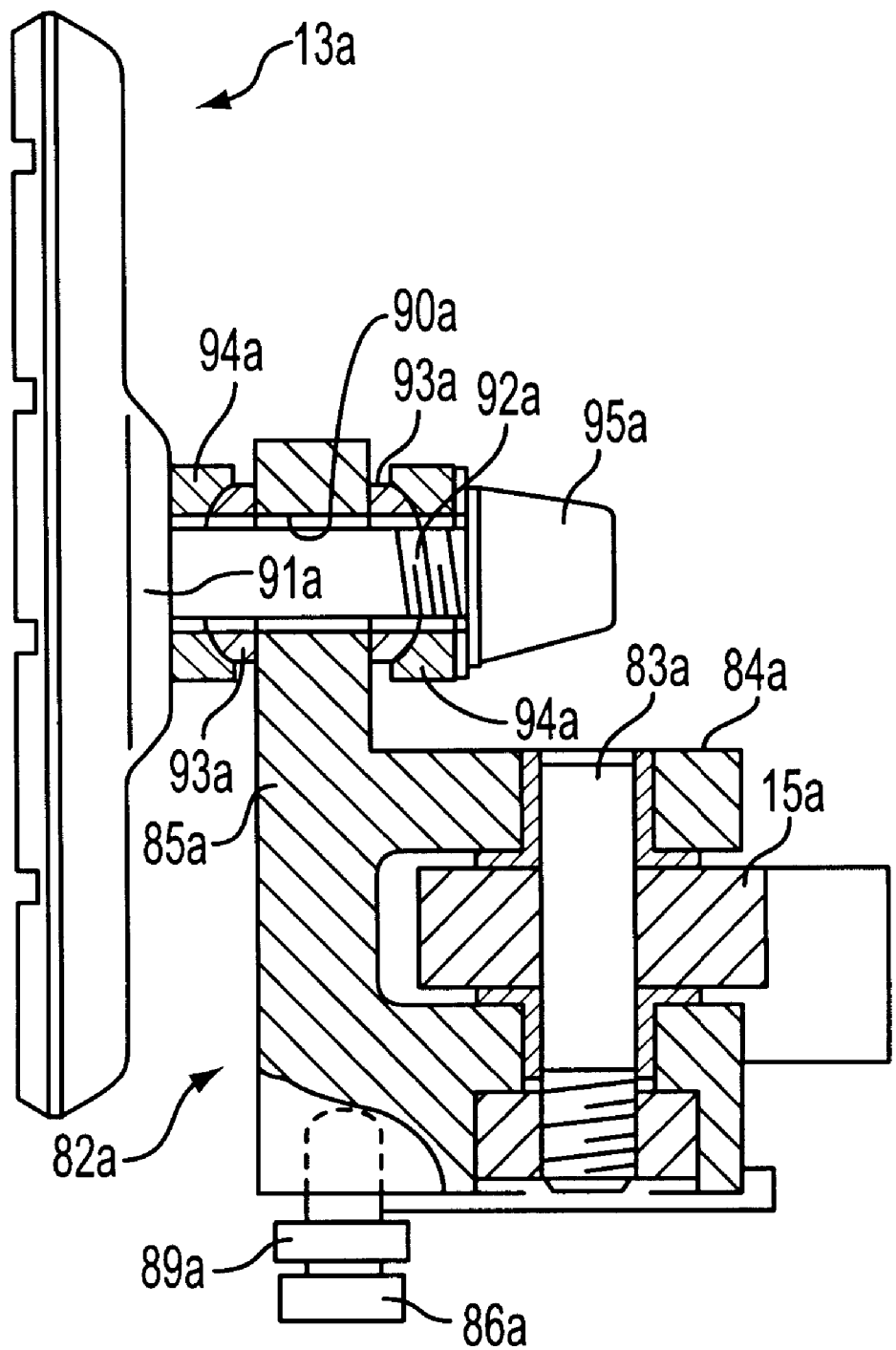
FIG. 13 is a view taken along line XIII—XIII in FIG. 10.

As shown in FIG. 13, the shoe mounting links 82a and 82b have link attachment components 84a and 84b that are formed in a U shape so as to sandwich both sides of the link bodies 15a and 15b, and shoe mounting components 85a and 85b that extend at a right angle from the link attachment components 84a and 84b. The attachment pins 83a and 83b are attached to the link attachment components 84a and 84b, and support pins 86a and 86b are fixed thereto. The upper ends of auxiliary links 89a and 89b are rotatably supported by these support pins 86a and 86b. Thus, the shoe mounting links 82a and 82b and the link bodies 15a and 15b are linked such that the link bodies 15a and 15b are sandwiched, and this raises the rigidity of the linked portion and allows undercutting of the brake shoes 13a and 13b to be suppressed. Shoe mounting slots 90a and 90b that are longer in the vertical direction (the direction perpendicular to the page in FIG. 13) are formed in the mounting components 85a and 85b. As shown in FIG. 10, these shoe mounting slots 90a and 90b are formed such that the distance L between the rear ends of the brake shoes 13a and 13b and the stepped portions of the fixing pins 9a and 9b is at least 25 mm. Disposing the shoe mounting slots 90a and 90b in these positions makes the braking center closer to the center of the front fork 4 and reduces the moment generated by rebound. Accordingly, the force that acts on the front fork 4 is weaker and the rigidity of the brake device is higher.

As shown in FIG. 9, the auxiliary links 89a and 89b are flat members arranged parallel to the link bodies 15a and 15b, and their upper ends are rotatably linked to the front surfaces of the link attachment components 84a and 84b of the shoe mounting links 82a and 82b by the support pins 86a and 86b. Their lower ends, as shown in FIGS. 10 and 11, are rotatably linked to the link bases 65a and 65b by support pins 87a and 87b that are attached to the distal ends of the arms 68a and 68b. The distance from the axis of the fixing pins 9a and 9b to the axis of the support pins 87a and 87b is equal to the distance from the axis of the attachment pins 83a and 83b to the axis of the support pins 86a and 86b. Also, the distance from the axis of the support pins 86a and 86b positioned at both ends of the auxiliary links 89a and 89b to the axis of the support pins 87a and 87b is equal to the distance from the axis of the fixing pins 9a and 9b to the axis of the attachment pins 83a and 83b. Specifically, part of the link bodies 15a and 15b between these pins, the link bases 65a and 65b, part of the shoe mounting links 82a and 82b, and the auxiliary links 89a and 89b constitute a four-bar link mechanism. Accordingly, the shoe mounting links 82a and 82b move parallel to the line segment that connects the axis of the fixing pins 9a and 9b to the axis of the support pins 87a and 87b.

As shown in FIG. 13, the brake shoes 13a and 13b are inserted into the shoe mounting slots 90a and 90b. The brake shoes 13a and 13b respectively have rubber shoe bodies 91a and 91b and shoe attachment pins 92a and 92b that extend outward from the approximate center in the longitudinal direction of the shoe bodies 91a and 91b. External threads are formed at the distal ends of the shoe attachment pins 92a and 92b, and the mounting components 85a and 85b are fixed by nuts 95a and 95b that thread onto these external threads. Convex washers 93a and 93b, which have convex surfaces that form a partial spherical surface, and concave washers 94a and 94b, which have concave surfaces that mesh with the convex surfaces, are positioned between the nuts 95a and 95b and the mounting components 85a and 85b, and between the shoe bodies 91a and 91b and the mounting components 85a and 85b. Here, fastening the brake shoes 13a and 13b inside the shoe mounting slots 90a and 90b of the mounting components 85a and 85b with the convex washers 93a and 93b and the concave washers 94a and 94b interposed allows the vertical position and inclination of the brake shoes 13a and 13b to be freely adjusted so as to match the position and inclination of the lateral surfaces 5a of the rim 5.

The operation of this embodiment will now be described.

When the rider operates the brake lever 7, the inner cable 10a is pulled into the outer casing 10b, the brake links 12a and 12b swing in their respective closing directions against the biasing force of the return springs 74a and 74b, and the shoe bodies 91a and 91b of the brake shoes 13a and 13b hit the lateral surfaces 5a of the rim 5. At this point, the action of the link mechanism, including the auxiliary links 89a and 89b, causes the shoe mounting links 82a and 82b to move to the inside in a state in which the specified attitude is maintained. As a result, the shoe bodies 91a and 91b reliably hit the rim 5, and a powerful braking force can be obtained. Since these auxiliary links 89a and 89b are positioned to the inside of the link bodies 15a and 15b, the brake device 1c is compact in its width dimensions. As a result, the brake device 1c does not stick out from the front fork 4, for example, so it will not hit the leg of the rider or other parts during its operation. Furthermore, even if the shoe bodies 91a and 91b are subjected to the action of rebound, sufficient braking force will be obtained because the specified attitude of the link bases 65a and 65b is maintained by the stop pins 70a and 70b.

A braking force is generated when the shoe bodies 91a and 91b hit the lateral surfaces 5a. The braking force generated here is proportional to the amount of movement of the inner cable 10a (the cable stroke). When the inner cable 10a is pulled further until the operating force of the inner cable 10a thus generated exceeds the biasing force of the torsion coil spring 21, then the torsion coil spring 21 bends and the swing link 20 swings to the first stop component 27 side. When the swing link 20 swings, the braking force corresponds to the biasing force, which increases with the bending of the torsion coil spring 21, and there is less change in the braking characteristic- As a result, just as discussed above, there is less change in braking force with respect to the operation of the brake lever 7. Therefore, even if the brake lever is operated excessively by a novice who is unfamiliar with the brake operation, the braking force will not increase that much, making the brake easier to operate. The swinging of the swing link 20 is complete when an abutment 154 on the swing link 20 contacts a corresponding abutment 156 in the form of a stop pin on the link body. Upon completion of this swinging, the braking characteristic returns to its original large value, and a powerful braking force is obtained.

Here again, since the braking characteristic can be adjusted small on the brake device 1c side during braking by means of the torsion coil spring 21 and the swing link 20 provided to the link body 15b, the desired braking characteristic corresponding to the brake device 1c can be reliably obtained during braking. Also, since no extra devices are provided to the operating cable 10, the operating cable 10 is easy to lay out.

When the brake lever 7 is released, the inner cable 10a slackens, the biasing force of the return springs 74a and 74b causes the brake links 12a and 12b to swing in the opening directions, the distal ends of the shoe bodies 91a and 91b of the brake shoes 13a and 13b move away from the lateral surfaces 5a of the rim, and the braking is released.

Figure 14:
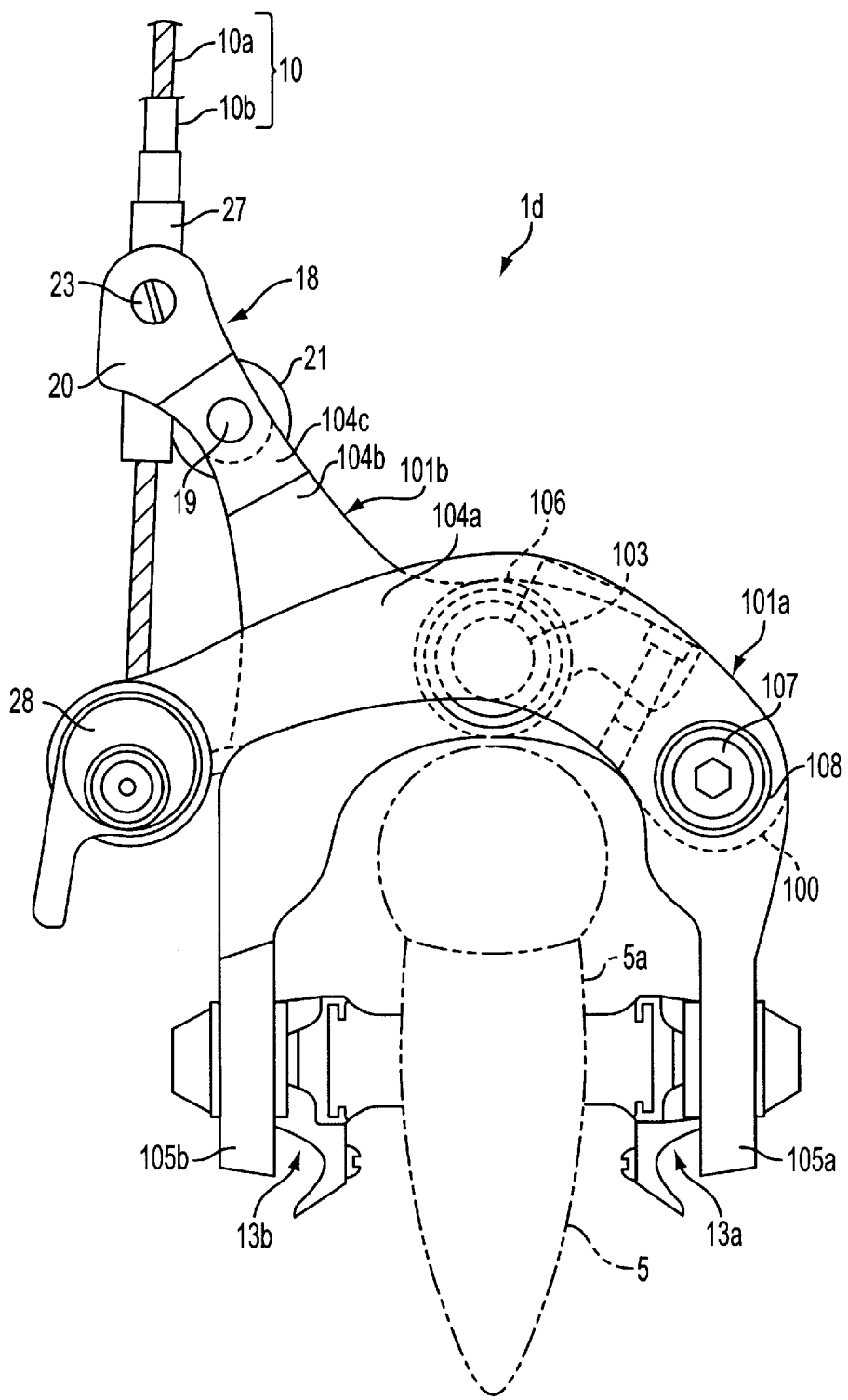
FIG. 14 is a front view of another alternative embodiment of a brake device according to the present invention.

As shown in FIG. 14, the brake force control mechanism may be provided to a caliper type of brake device 1d instead of a cantilevered brake device. In FIG. 14, the caliper brake device 1d has a gate component 100, an outer brake link 101a that is swingably linked to the distal end of the gate component 100, an inner brake link 101b that is swingably linked to the base end of the gate component 100, and a biasing member (not shown) that energizes the brake links 101a and 101b to the brake release side. The gate component 100 is a rod-shaped member, and the base end is mounted by a mounting bolt 103 to the front or rear fork of the bicycle. The inner brake link 101b is swingably supported by this mounting bolt 103. The outer brake link 101a has a roughly C-shaped link body 104a, and a shoe attachment component 105a provided to the distal end of the link body 104a. A second attachment component 28 that attaches the inner cable 10a is provided to the base end of the link body 104a. The support component 108 of a support bolt 107 mounted to the distal end of the gate component 100 is provided at a midway position.

The inner brake link 101b has a roughly Y-shaped link body 104b, and a shoe attachment component 105b that is provided to one of the distal ends of the link body 104b. A bracket 104c is formed at the base end (upper end) of the link body 104b, and a brake force control mechanism 18 is provided to the bracket 104c. This structure is the same as that discussed above, so its description will be omitted. The support component 106 of the mounting bolt 103 is provided to the other distal end. The brake shoes 13a and 13b are mounted on the shoe attachment components 105a and 105b.

When the brake lever is operated, the inner cable 10a is pulled into the outer casing 10b, the brake links 101a and 101b swing in their respective closing directions against the biasing force of the brake links 101a and 101b, and the brake shoes 13a and 13b hit the lateral surfaces 5a of the rim 5. A braking force is generated when the brake shoes 13a and 13b contact the lateral surfaces 5a, and when the operating force of the inner cable 10a exceeds the biasing force of the torsion coil spring 21, then the swing link 20 swings and the braking characteristic becomes small. This operation is the same as the previous embodiments, and the same merits as in the above embodiments are obtained.

Figure 15:
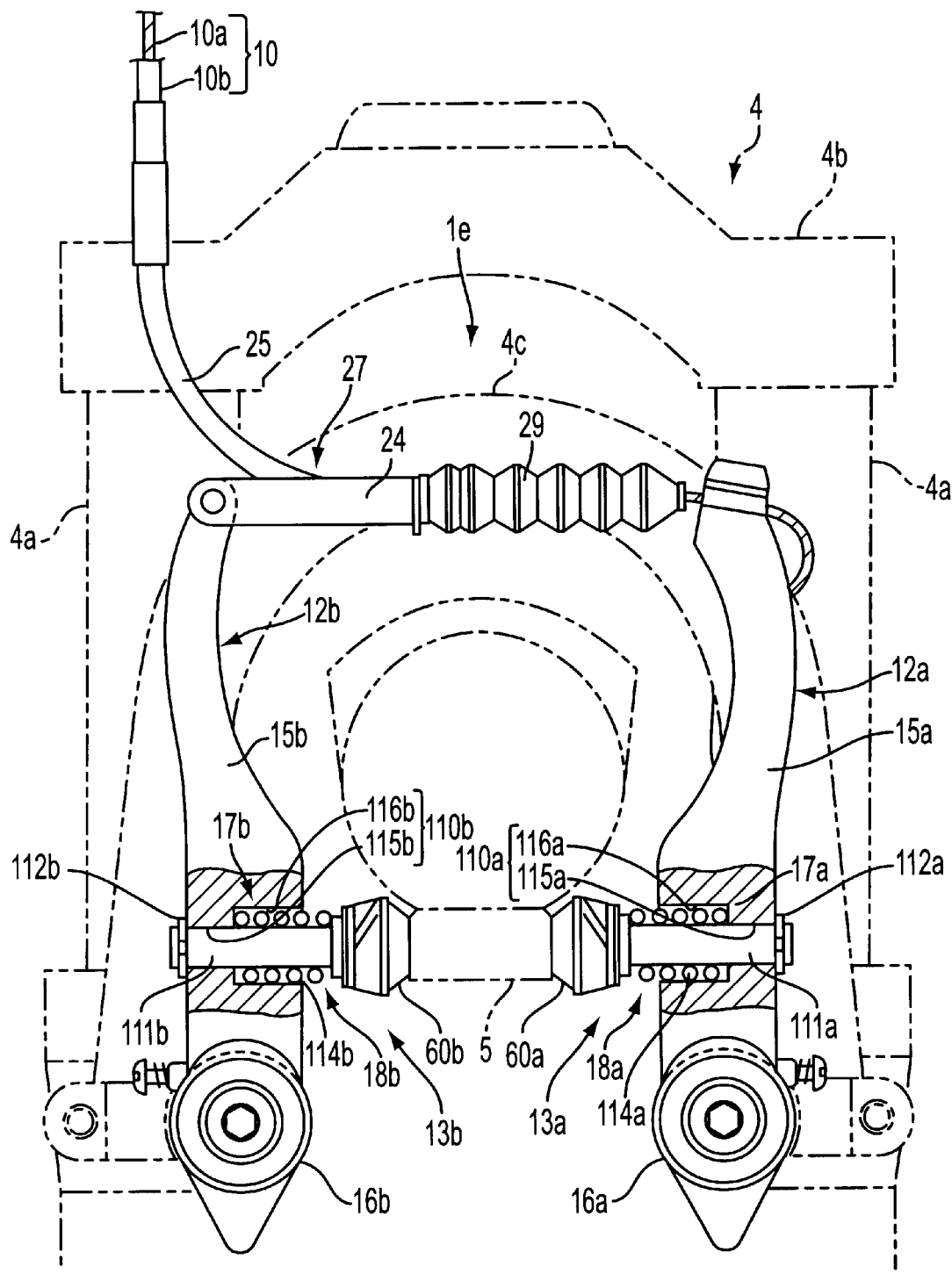
FIG. 15 is a front view of another alternative embodiment of a brake device according to the present invention.

As shown in FIG. 15, the brake force control mechanism 18 may also be provided to the two shoe attachment components 17a and 17b instead of being provided to the link bodies. With this brake device 1e, shoe mounting holes 110a and 110b that go through to the left and right are provided to the shoe attachment components 17a and 17b at some point along the link bodies 15a and 15b. The shoe mounting holes 110a and 110b have small-diameter support hole components 111a and 115b formed to the outside, and large-diameter housing hole components 116a and 116b formed to the inside. The support hole components 115a and 115b of the shoe mounting holes 110a and 110b support the shoe mounting pins 111a and 111b of the brake shoes 13a and 13b such that they are able to move to the left and right. The shoe bodies 60a and 60b are fixed to the distal ends of these shoe mounting pins 111a and 111b. Stop members in the form of stop rings 112a and 112b are fitted to the rear ends of the shoe mounting pins 111a and 111b, which restricts the protrusion positions of the brake shoes 13a and 13b. Coil springs 114a and 114b are disposed in a compressed state on the outer periphery side of the shoe mounting pins 111a and 111b in the housing hole components 116a and 116b of the shoe mounting holes 110a and 110b. One end of the coil springs 114a and 114b is attached to the stepped portion between the support hole components 115a and 115b and the housing hole components 116a and 116b, the other end is attached to the shoe bodies 60a and 60b, and the brake shoes 13a and 13b are energized to the rim 5 side. Braking characteristic variation components 18a and 18b are constituted by these coil springs 114a and 114b and the support hole components 115a and 115b of the shoe mounting holes 110a and 110b.

With the brake device 1e structured as above, operation of the brake lever 7 causes the brake shoes 13a and 13b to hit the lateral surfaces 5a of the rim 5, and when the inner cable 10a is pulled further, the coil springs 114a and 114b bend and the brake shoes 13a and 13b relatively retract with respect to the link bodies 15a and 15b. As a result, the braking force corresponds to the biasing force, which is decreased by the bending of the coil springs 114a and 114b, the braking characteristic becomes small, and the desired braking characteristic is obtained on the brake device 1e side. In this embodiment, the biasing force of the coil springs 114a and 114b cannot be varied, but the shoe mounting pins 111a and 111b may be positioned by nuts instead of the stop rings 112a and 112b, and the biasing force of the coil springs 114a and 114b may then adjusted by means of the amount of tightening of the nuts.

Figure 17:
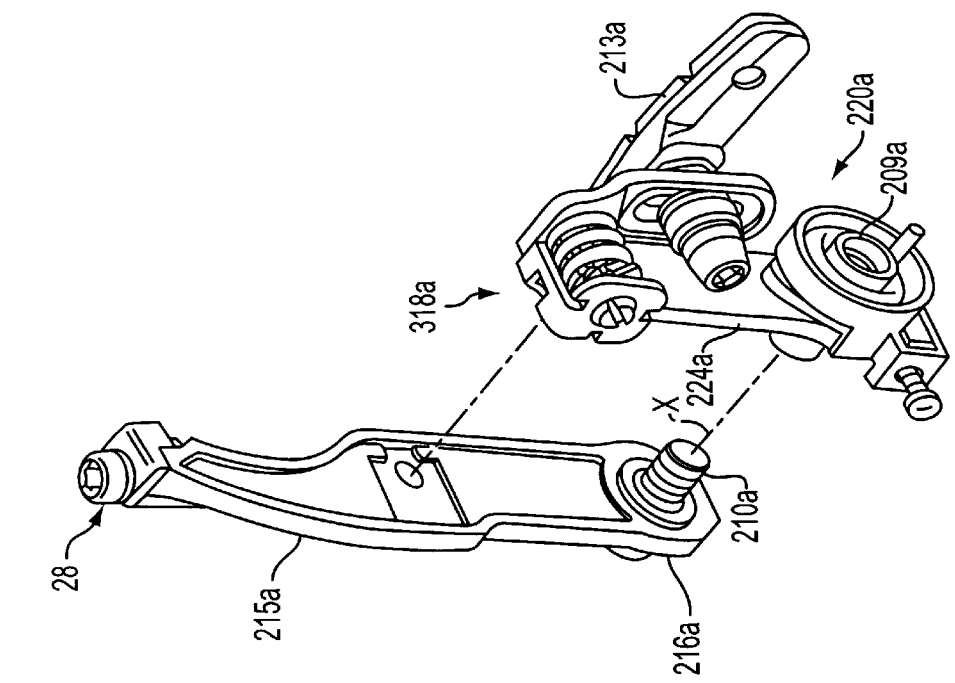
FIG. 17 is a partially exploded view of the brake device shown in FIG. 16.
Figure 16:
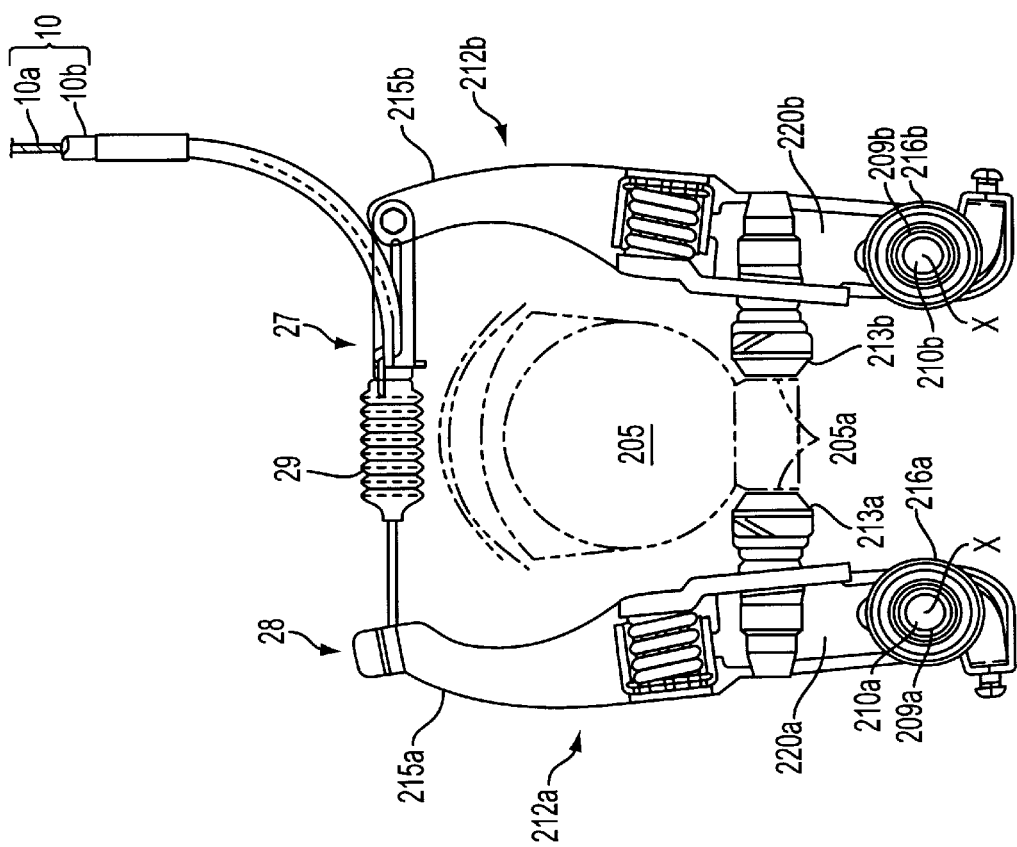
FIG. 16 is a rear view of another alternative embodiment of a brake device according to the present invention.
Figure 18:
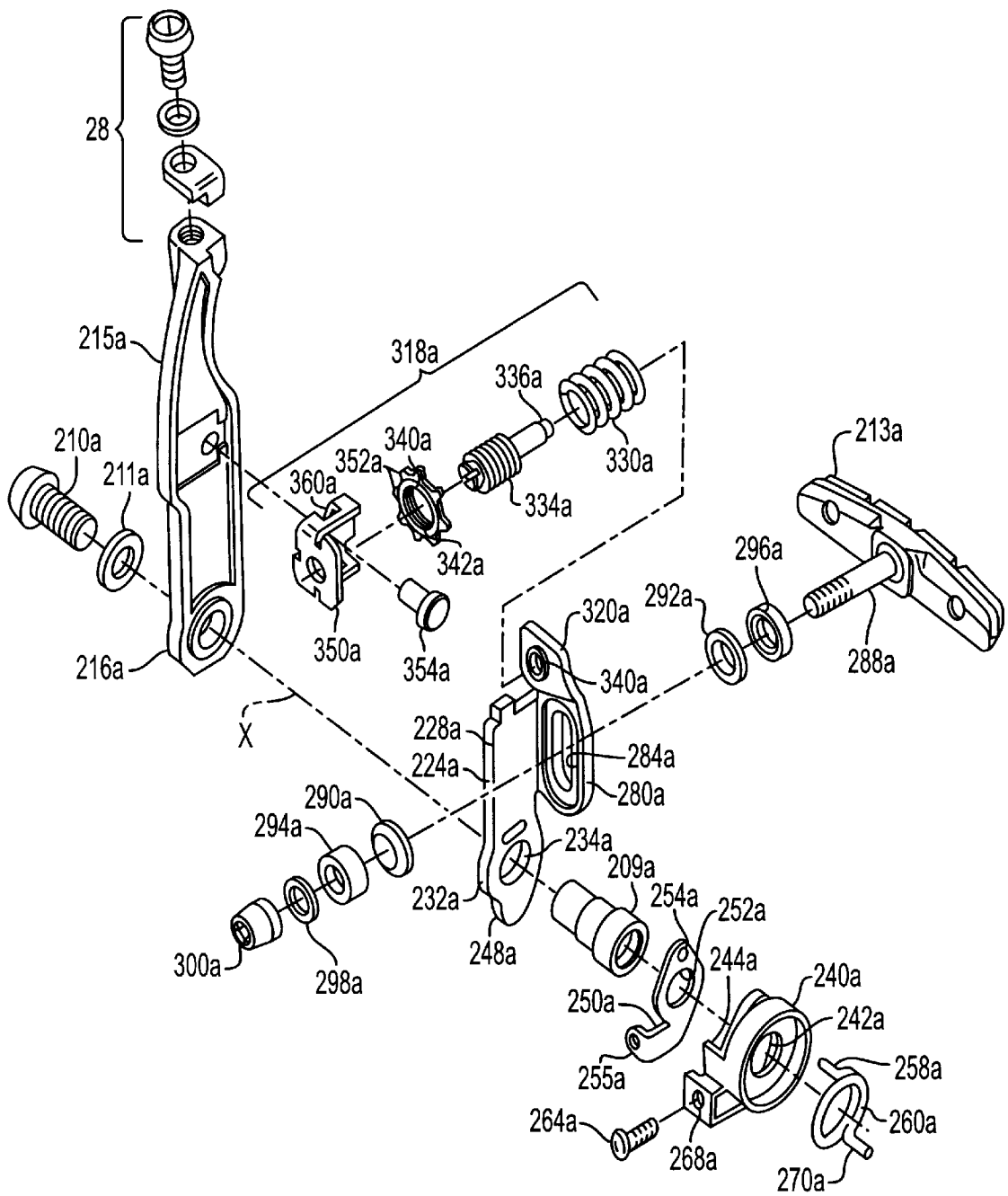
FIG. 18 is a completely exploded view of the brake device shown in FIG. 16.

FIG. 16 is a rear view of another alternative embodiment of a brake device 200 according to the present invention, FIG. 17 is a partially exploded view of brake device 200, and FIG. 18 is a completely exploded view of brake device 200. In this embodiment, brake device 200 has a pair of brake links 212a and 212b mounted to the bicycle in a manner similar to the embodiment shown in FIG. 2. Brake shoes 213a and 213b are attached facing each other at some point along the brake links 212a and 212b such that they can be adjusted. Brake shoes 213a and 213b receive the brake resistive force $F_R$ from contact between the brake pads and the lateral surfaces 205a of the rim 205. The brake links 212a and 212b have brake arms in the form of link bodies 215a and 215b, respectively, in the form of plates that extend upward and have been thinned on their back side. Rotational support components 216a and 216b that are rotatably supported on fixing pins 209a and 209b extending from the seats on the frame are provided to the base ends of the link bodies 215a and 215b so that each link body pivots around a pivot axis X. Brake links 212a and 212b are rotatably fixed to fixing pins 209a and 209b by bolts 210a,210b and washers 211a,211b, respectively.

Brake shoe pivoting assemblies 220a and 220b are rotatably supported on fixing pins 209a and 209b and are coupled to link bodies 215a and 215b, respectively. Because of the symmetrical nature of brake links 212a and 212b, only the details of brake shoe pivoting assembly 220a will be described in detail.

As shown more specifically in FIG. 18, brake shoe pivoting assembly 220a includes a pivot link 224a having an upper portion 228a and a lower portion 232a with an opening 234a that fits around fixing pin 209a so that pivot link 224a pivots around the pivot axis X. A spring cover 240a having an opening 242a that fits around fixing pin 209a has an abutment 244a that abuts against an abutment 248a on pivot link 224a. A spring retainer 250a has an opening 252a that fits around fixing pin 209a so that spring retainer 250a is disposed between pivot link 224a and spring cover 240a. Spring retainer 250a has a spring retaining opening 254a and an adjustment abutment 255a. Spring retaining opening 254a retains an end 258a of a spring 260a, and adjustment abutment 250a abuts against an end of an adjusting screw 264a that screws into a threaded opening 268a in spring cover 240a. The other end 270a of spring 260a is fixed to the bicycle frame (not shown). Thus, the biasing force of spring 260a may be adjusted by turning adjusting screw 264a which, in turn, rotates spring retainer 250a around fixing pin 209a to move spring end 258a.

A brake shoe mounting flange 280a with a vertically elongated slot 284a is disposed on pivot link 224a. Brake shoe 213a has a threaded shaft 288a that extends through slot 284a and is fixed to brake shoe mounting flange 280a through convex washers 290a,292a, concave washers 294a, 296a, fastening washer 298a and fastening nut 300a in a known manner that allows the mounting angle of brake shoe 213a to be varied.

A brake force control mechanism 318a is mounted to a flange 320a on the upper portion 228a of pivot link 224a above brake shoe 213a. Brake force control mechanism 318a includes a spring 330a, a spring force adjusting screw 334a having an end 336a that fits within an opening 340a in flange 320a, a spring adjusting star washer 340a having a threaded opening 342a that meshes with screw 334a, and a brake arm coupling member 350a that is fixed to brake arm 215a through a screw or rivet 354a. Radial projections 352a of spring adjusting star washer 340a fit within an opening 360a of brake arm coupling member 350a such that spring adjusting star washer 340a can not rotate relative to brake arm coupling member 350a but can move toward and away from spring 330a in response to rotation of spring force adjusting screw 334a to selectively compress spring 330a against flange 320a.

In operation, brake links 212a and 212b move toward the side surfaces 205a of rim 205 in response to the operation of brake cable 10 until brake shoes 213a and 213b contact side surfaces 205a of rim 205. Using brake link 212a as an example, when the braking force applied by cable 10 exceeds the biasing compressive force of spring 330a, spring 330a compresses to limit the amount of braking force applied to rim 205. Spring force adjusting screw 334a may be used to adjust the biasing force of spring 330a and hence the braking force required to further compress spring 330a. Brake link 212b operates the same way.

The embodiments shown in FIGS. 15–18 have the advantages of the embodiments shown in FIGS. 1–14. Furthermore, using coiled compression springs and placing the springs on an intermediate portion of the brake arm assembly has farther advantages. For example, the operation of a coil compression spring is not affected by dirt and other contaminants as with the torsion spring shown in FIG. 4. Also, placing the coiled compression springs on an intermediate portion of the brake arm reduces the amount of required spring stroke to achieve the brake control effect. That is, for a given pivoting angle of the brake arm, the intermediate portion of the brake arm travels a smaller distance than the upper portion of the brake arm. As a result, a spring placed on the intermediate portion of the brake arm does not need to accommodate as much displacement as a spring placed on the upper portion of the brake arm. A stiffer spring can be used, and therefore the number of coils needed to produce the brake control effect can be reduced. In the embodiments shown in FIGS. 15–18, placing the springs half way down each brake arm reduces the required operating stroke of each spring by one half, so the overall required spring stroke is one quarter the amount required by the spring shown in FIG. 4. This is very desirable when the available amount of brake cable travel, and thus the available amount of pivoting of the brake arms, is limited by the design of the brake lever. The size of the coiled compression springs in these embodiments may be reduced substantially. Using a smaller spring and placing the springs on an intermediate portion of the brake arm assembly results in a more compact structure and is more aesthetically appealing. Furthermore, the use of a spring adjusting screw for each spring allows the rider to choose many different brake control characteristics.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. In the embodiments shown in FIGS. 15–18 the brake force control mechanism may be provided to just one of the brake links. The present invention can also be applied to a rear brake instead of a front brake. The member that biases the swing links or pivot links is not limited to a torsion coil spring, and other biasing members may be used instead. Thus, the scope of the invention should not be limited by the specific structures disclosed. Instead, the true scope of the invention should be determined by the following claims.

What is claimed is:

1. A brake apparatus comprising:
   a brake arm;
   a brake pad coupling component coupled to the brake arm for receiving a brake resistive force from contact between a brake pad and a wheel rim;
   a control element coupling component coupled to the brake arm for receiving a brake control force from a control element;
   a brake force control mechanism coupled in a force transmission path between the brake pad coupling component and the control element coupling component for allowing relative movement between the brake pad coupling component and the control element coupling component when both the brake resistive force and the brake control force exceed particular nonzero values; and
   wherein the brake force control mechanism includes a biasing mechanism disposed in the force transmission path for biasing the brake pad coupling component and the control element coupling component relative to each other.

2. The apparatus according to claim 1 wherein the brake arm includes a rotational support component for pivoting around a pivot axis, and wherein the brake pad coupling component comprises a pivot link that pivots around the pivot axis.

3. The apparatus according to claim 2 wherein the pivot link is coupled to the brake arm for pivoting relative to the brake arm.

4. The apparatus according to claim 3 wherein a lower portion of the pivot link pivots around the pivot axis, and wherein an upper portion of the pivot link is attached to the brake shoe.

5. The apparatus according to claim 4 wherein the biasing mechanism comprises a spring disposed between the brake arm and the upper portion of the pivot link.

6. The apparatus according to claim 5 further comprising a spring bias adjustment mechanism for adjusting a biasing force of the spring.

7. The apparatus according to claim 6 wherein the spring is disposed above the brake shoe.

8. The apparatus according to claim 5 wherein the spring comprises a compression spring.

9. The apparatus according to claim 2 wherein the biasing mechanism includes a spring disposed between the pivot link and the brake arm.

10. The apparatus according to claim 9 further comprising a spring bias adjustment mechanism for adjusting a biasing force of the spring.

11. The apparatus according to claim 9 wherein the spring comprises a compression spring.

12. The apparatus according to claim 9 further comprising brake arm biasing means for biasing the brake arm in a direction away from the wheel rim at a biasing force that is less than that of the biasing mechanism.

13. The apparatus according to claim 1 wherein the brake pad coupling component is disposed on one of an upper portion and a lower portion of the brake arm, wherein the control element coupling component is disposed on the other one of the upper portion and the lower portion of the brake arm, and wherein the brake arm includes a pivot coupling portion disposed on an intermediate portion of the brake arm for pivotably coupling the brake arm to a mounting member.

14. The apparatus according to claim 13 wherein the brake force control mechanism is disposed on the upper portion of the brake arm.

15. The apparatus according to claim 14 wherein the brake force control mechanism comprises:
   a swing link swingably coupled between the brake arm and the control element coupling component; and
   wherein the biasing mechanism biases the swing link to an initial position so that the swing link remains in the initial position until both the brake resistive force and the brake control force exceed the particular nonzero values.

16. The apparatus according to claim 15 wherein the brake force control mechanism further comprises a bias force varying mechanism for varying a bias force of the biasing mechanism.

17. The apparatus according to claim 16 wherein the biasing mechanism comprises a spring.

18. The apparatus according to claim 17 wherein the bias force varying mechanism comprises a cam which engages an end of the spring.

19. The apparatus according to claim 18 wherein the end of the spring is curved, wherein the cam is mounted to a linking shaft, and wherein the cam has a plurality of curved cam faces disposed at different radial distances from the linking shaft for engaging the end of the spring.

20. The apparatus according to claim 1 wherein the biasing mechanism is disposed entirely in the power transmission path between the brake pad coupling component and the control element coupling component.

21. The apparatus according to claim 19 wherein the biasing mechanism has a first end and a second end for generating a biasing force between the first end and the second end, wherein the first end and the second end are disposed in the power transmission path.

22. The apparatus according to claim 20 wherein the brake pad coupling component and the control element coupling component are coupled to the brake arm for integral movement therewith.

23. The apparatus according to claim 1 wherein the brake arm includes a pivot coupling portion disposed on one of an upper portion and a lower portion of the brake arm for pivotably coupling the brake arm to a mounting member, wherein the brake pad coupling component is disposed on an intermediate portion of the brake arm, and wherein the control element coupling component is disposed on the other one of the upper portion and the lower portion of the brake arm.

24. The apparatus according to claim 23 wherein the brake force control mechanism is disposed on the upper portion of the brake arm.

25. The apparatus according to claim 1 wherein the brake pad coupling component comprises a shoe attachment component formed on an intermediate portion of the brake arm.

26. The apparatus according to claim 25 wherein the brake pad coupling component further comprises an attachment bolt for mounting a brake shoe to the shoe attachment component.

27. The apparatus according to claim 1 wherein the brake force control mechanism is disposed in close proximity to the control element coupling component.

28. The apparatus according to claim 1 wherein the control element coupling component is attached to the brake arm for integral movement therewith.

29. The apparatus according to claim 1 further comprising brake arm biasing means for biasing the brake arm in a direction away from the wheel rim at a biasing force that is less than that of the biasing mechanism.

30. A brake apparatus comprising:
a brake arm including a pivot coupling portion disposed on a lower portion of the brake arm for pivotably coupling the brake arm to a mounting member;
a brake pad coupling component disposed on an intermediate portion of the brake arm for receiving a brake resistive force from contact between a brake pad and a wheel rim;
a control element coupling component disposed on an upper portion of the brake arm for receiving a brake control force from a control element;
a brake force control mechanism coupled in a force transmission path between the brake pad coupling component and the control element coupling component for allowing relative movement between the brake pad coupling component and the control element coupling component when both the brake resistive force and the brake control force exceed particular nonzero values;
wherein the brake force control mechanism comprises:
a swing link swingably coupled between the brake arm and the control element coupling component; and
a biasing mechanism for biasing the swing link to an initial position so that the swing link remains in the initial position until both the brake resistive force and the brake control force exceed the particular nonzero values.

31. The apparatus according to claim 30 wherein the brake force control mechanism further comprises a bias force varying mechanism for varying a bias force of the biasing mechanism.

32. The apparatus according to claim 31 wherein the biasing mechanism comprises a spring.

33. The apparatus according to claim 32 wherein the bias force varying mechanism comprises a cam which engages an end of the spring.

34. The apparatus according to claim 33 wherein the end of the spring is curved, wherein the cam is mounted to a linking shaft, and wherein the cam has a plurality of curved cam faces disposed at different radial distances from the linking shaft for engaging the end of the spring.

35. The apparatus according to claim 30 wherein the control element coupling component comprises a cable hook pivotably coupled to the swing link.

36. The apparatus according to claim 35 wherein the cable hook is structured for coupling to an inner guide for a control cable.

37. The apparatus according to claim 36 further comprising brake arm biasing means for biasing the brake arm in a direction away from the wheel rim at a biasing force that is less than that of the biasing mechanism.

38. The apparatus according to claim 30 wherein the control element coupling component comprises a screw attached to the swing link.

39. The apparatus according to claim 38 further comprising brake arm biasing means for biasing the brake arm in a direction away from the wheel rim at a biasing force that is less than that of the biasing mechanism.

40. A brake apparatus comprising:
a brake arm;
a brake pad coupling component coupled to the brake arm for receiving a brake resistive force from contact between a brake pad and a wheel rim;
wherein the brake pad coupling component comprises a shoe attachment component formed on an intermediate portion of the brake arm;
a control element coupling component coupled to the brake arm for receiving a brake control force from a control element;
a brake force control mechanism coupled in a force transmission path between the brake pad coupling component and the control element coupling component for allowing relative movement between the brake pad coupling component and the control element coupling component when both the brake resistive force and the brake control force exceed particular nonzero values;
wherein the brake pad coupling component comprises:
a pin slidably fitted within an opening formed in the shoe attachment component for attaching a brake shoe to the shoe attachment component; and
a stop member attached to the pin for limiting sliding displacement of the pin relative to the shoe attachment component.

41. The apparatus according to claim 40 wherein the brake force control mechanism comprises a bias mechanism coupled between the brake shoe and the shoe attachment component for biasing the brake shoe to an initial position.

42. The apparatus according to claim 41 wherein the bias mechanism comprises a compression spring.

43. The apparatus according to claim 41 further comprising brake arm biasing means for biasing the brake arm in a direction away from the wheel rim at a force that is less than that of the biasing mechanism.

44. A brake apparatus comprising:
a brake arm;
a brake pad coupling component coupled to the brake arm for receiving a brake resistive force from contact between a brake pad and a wheel rim;
a control element coupling component coupled to the brake arm for receiving a brake control force from a control element;
a brake force control mechanism coupled in a force transmission path between the brake pad coupling component and the control element coupling component in close proximity to the control element coupling component for allowing relative movement between the brake pad coupling component and the control element coupling component when both the brake resistive force and the brake control force exceed particular nonzero values;

wherein the brake force control mechanism comprises:

a swing link swingably coupled between the brake arm and the control element coupling component; and a biasing mechanism for biasing the swing link to an initial position so that the swing link remains in the initial position until both the brake resistive force and the brake control force exceed the particular nonzero values.

45. The apparatus according to claim 44 wherein the brake force control mechanism further comprises a bias force varying mechanism for varying a bias force of the biasing mechanism.

46. The apparatus according to claim 45 wherein the biasing mechanism comprises a spring.

47. The apparatus according to claim 46 wherein the bias force varying mechanism comprises a cam which engages an end of the spring.

48. The apparatus according to claim 47 wherein the end of the spring is curved, wherein the cam is mounted to a linking shaft, and wherein the cam has a plurality of curved cam faces disposed at different radial distances from the linking shaft for engaging the end of the spring.

49. A bicycle brake apparatus wherein brake shoes are pressed against a wheel to effect braking by moving an inner cable positioned inside an outer casing, the apparatus comprising:

swinging first and second brake links that each have a link body and a shoe attachment component that is provided to the link body and that is used to attach the brake shoes;

a first stop component that is provided to the first brake link and that is used to attach the outer casing;

a second stop component that is provided to the second brake link and that is used to attach the inner cable;

brake force control means including a swing member that is swingably provided to the first brake link, and a first biasing member that biases the swing member away from the second stop component, wherein a change in braking force with respect to the amount of movement of the inner cable is reduced by swinging the swing member against the biasing force of the first biasing member during braking; and brake link biasing means for biasing both of the brake links to the brake release side at a biasing force that is less than that of the first biasing member.

* * * * *